(12) United States Patent
Ovadia et al.

(10) Patent No.: US 7,340,169 B2
(45) Date of Patent: Mar. 4, 2008

(54) DYNAMIC ROUTE DISCOVERY FOR OPTICAL SWITCHED NETWORKS USING PEER ROUTING

(75) Inventors: Shlomo Ovadia, San Jose, CA (US); Christian Maciocco, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 10/713,585

(22) Filed: Nov. 13, 2003

(65) Prior Publication Data
US 2005/0105905 A1    May 19, 2005

(51) Int. Cl.
*H04J 14/00* (2006.01)
(52) U.S. Cl. .............................. 398/57; 398/45; 398/49
(58) Field of Classification Search ............... 398/49, 398/45, 51, 54, 50, 55, 56, 57, 58, 59, 66
See application file for complete search history.

(56) References Cited

U.S. PATENT DOCUMENTS

| | | | |
|---|---|---|---|
| 4,663,748 | A | 5/1987 | Karbowiak et al. |
| 5,235,592 | A | 8/1993 | Cheng et al. |
| 5,331,642 | A | 7/1994 | Valley et al. |
| 5,457,556 | A | 10/1995 | Shiragaki |
| 5,506,712 | A | 4/1996 | Sasayama et al. |
| 5,550,803 | A | 8/1996 | Crayford et al. |
| 5,559,796 | A | 9/1996 | Edem et al. |
| 5,646,943 | A | 7/1997 | Elwalid |
| 5,768,274 | A | 6/1998 | Murakami et al. |
| 5,838,663 | A | 11/1998 | Elwalid et al. |
| 5,970,050 | A | 10/1999 | Johnson |
| 5,978,356 | A | 11/1999 | Elwalid et al. |
| 6,111,673 | A | 8/2000 | Chang et al. |
| 6,222,839 | B1 | 4/2001 | Nakazaki et al. |

(Continued)

FOREIGN PATENT DOCUMENTS

CN    1384618    12/2002

(Continued)

OTHER PUBLICATIONS

O'Mahony, Mike J. et al., "The Application of Optical Packet Switching in Future Communication Networks", IEEE Communications Magazine, Mar. 2001, pp. 128-135.

(Continued)

*Primary Examiner*—M. R. Sedighian
(74) *Attorney, Agent, or Firm*—Blakely, Sokoloff, Taylor & Zafman LLP

(57) ABSTRACT

An architecture and method for performing dynamic route discovery and time slot reservation provisioning within optical-switched networks. The method employs extensions to the RSVP-TE signaling protocol, which uses various messages to reserve resources. Under a peer routing embodiment, routing trees and resource availability data are maintained by the edge nodes. A lightpath route is dynamically selected based on selection criteria applied to the routing tree data and the availability of resources along the lightpath. Link state information, including resource reservation data, is broadcast by the switching nodes to update the edge nodes of their resource availability. A resource reservation message is passed between nodes defined by an explicit route contained in the message, and resource availability is confirmed for the entire lightpath prior to confirming the resource reservations.

37 Claims, 18 Drawing Sheets

U.S. PATENT DOCUMENTS

| | | |
|---|---|---|
| 6,260,155 B1 | 7/2001 | Dellacona |
| 6,271,946 B1 | 8/2001 | Chang et al. |
| 6,272,117 B1 | 8/2001 | Choi et al. |
| 6,325,636 B1 | 12/2001 | Hipp et al. |
| 6,339,488 B1 | 1/2002 | Beshai et al. |
| 6,400,863 B1 | 6/2002 | Weinstock et al. |
| 6,411,506 B1 | 6/2002 | Hipp et al. |
| 6,466,586 B1 | 10/2002 | Darveau et al. |
| 6,487,686 B1 | 11/2002 | Yamazaki et al. |
| 6,490,292 B1 | 12/2002 | Matsuzawa |
| 6,498,667 B1 | 12/2002 | Masucci et al. |
| 6,519,062 B1 | 2/2003 | Yoo |
| 6,519,255 B1 | 2/2003 | Graves |
| 6,525,850 B1 | 2/2003 | Chang et al. |
| 6,542,499 B1 | 4/2003 | Murphy et al. |
| 6,545,781 B1 | 4/2003 | Chang et al. |
| 6,603,893 B1 | 8/2003 | Liu et al. |
| 6,615,382 B1 | 9/2003 | Kang et al. |
| 6,665,495 B1 | 12/2003 | Miles et al. |
| 6,671,256 B1 * | 12/2003 | Xiong et al. ............... 370/230 |
| 6,674,558 B1 | 1/2004 | Chang et al. |
| 6,690,036 B2 | 2/2004 | Liu et al. |
| 6,697,374 B1 | 2/2004 | Shraga et al. |
| 6,721,271 B1 | 4/2004 | Beshai et al. |
| 6,721,315 B1 | 4/2004 | Xiong et al. |
| 6,839,322 B1 | 1/2005 | Smith |
| 6,842,424 B1 | 1/2005 | Key et al. |
| 6,873,797 B2 | 3/2005 | Chang et al. |
| 6,898,205 B1 | 5/2005 | Chaskar et al. |
| 6,925,257 B2 | 8/2005 | Yoo |
| 6,940,863 B2 | 9/2005 | Xue et al. |
| 6,956,868 B2 | 10/2005 | Qiao |
| 6,987,770 B1 | 1/2006 | Yonge, III |
| 6,990,071 B2 | 1/2006 | Adam et al. |
| 7,023,846 B1 | 4/2006 | Andersson et al. |
| 7,035,537 B2 | 4/2006 | Wang et al. |
| 7,092,633 B2 * | 8/2006 | Fumagalli et al. ............ 398/59 |
| 7,106,968 B2 | 9/2006 | Lahav et al. |
| 2002/0018263 A1 | 2/2002 | Ge et al. |
| 2002/0018468 A1 | 2/2002 | Nishihara |
| 2002/0023249 A1 | 2/2002 | Temullo et al. |
| 2002/0024700 A1 | 2/2002 | Yokoyama et al. |
| 2002/0027686 A1 | 3/2002 | Wada et al. |
| 2002/0063924 A1 | 5/2002 | Kimbrough et al. |
| 2002/0109878 A1 | 8/2002 | Qiao |
| 2002/0118419 A1 | 8/2002 | Zheng et al. |
| 2002/0126337 A1 | 9/2002 | Uematsu et al. |
| 2002/0141400 A1 | 10/2002 | DeMartino |
| 2002/0150099 A1 | 10/2002 | Pung et al. |
| 2002/0154360 A1 | 10/2002 | Liu |
| 2002/0159114 A1 * | 10/2002 | Sahasrabuddhe et al. ... 359/117 |
| 2002/0186433 A1 * | 12/2002 | Mishra ...................... 359/128 |
| 2002/0186695 A1 | 12/2002 | Schwartz et al. |
| 2002/0196808 A1 | 12/2002 | Karri et al. |
| 2003/0002499 A1 | 1/2003 | Cummings et al. |
| 2003/0009582 A1 | 1/2003 | Qiao et al. |
| 2003/0016411 A1 | 1/2003 | Zhou et al. |
| 2003/0031198 A1 | 2/2003 | Currivan et al. |
| 2003/0037297 A1 | 2/2003 | Araki |
| 2003/0039007 A1 | 2/2003 | Ramadas et al. |
| 2003/0043430 A1 | 3/2003 | Handelman |
| 2003/0048506 A1 | 3/2003 | Handelman |
| 2003/0053475 A1 | 3/2003 | Veeraraghavan et al. |
| 2003/0067880 A1 | 4/2003 | Chiruvolu |
| 2003/0099243 A1 | 5/2003 | Oh et al. |
| 2003/0120799 A1 | 6/2003 | Lahav et al. |
| 2003/0189933 A1 | 10/2003 | Ozugur et al. |
| 2003/0198471 A1 | 10/2003 | Ovadia |
| 2003/0214979 A1 | 11/2003 | Kang et al. |
| 2004/0004966 A1 | 1/2004 | Foster et al. |
| 2004/0052525 A1 | 3/2004 | Ovadia |
| 2004/0062263 A1 | 4/2004 | Charcranoon et al. |
| 2004/0120261 A1 | 6/2004 | Ovadia |
| 2004/0131061 A1 | 7/2004 | Matsuoka et al. |
| 2004/0156325 A1 | 8/2004 | Perkins et al. |
| 2004/0156390 A1 | 8/2004 | Prasad et al. |
| 2004/0170165 A1 | 9/2004 | Maciocco et al. |
| 2004/0170431 A1 | 9/2004 | Maciocco et al. |
| 2004/0208171 A1 | 10/2004 | Ovadia et al. |
| 2004/0208172 A1 | 10/2004 | Ovadia et al. |
| 2004/0208544 A1 | 10/2004 | Ovadia |
| 2004/0208554 A1 | 10/2004 | Wakai et al. |
| 2004/0234263 A1 | 11/2004 | Ovadia et al. |
| 2004/0252995 A1 | 12/2004 | Ovadia et al. |
| 2004/0258407 A1 | 12/2004 | Maciocco et al. |
| 2004/0264960 A1 | 12/2004 | Maciocco et al. |
| 2005/0030951 A1 | 2/2005 | Maciocco et al. |
| 2005/0063701 A1 | 3/2005 | Ovadia et al. |
| 2005/0068968 A1 | 3/2005 | Ovadia et al. |
| 2005/0068995 A1 | 3/2005 | Lahav et al. |
| 2005/0089327 A1 | 4/2005 | Ovadia et al. |
| 2005/0105905 A1 | 5/2005 | Ovadia et al. |
| 2005/0152349 A1 | 7/2005 | Takeuchi et al. |
| 2005/0175183 A1 | 8/2005 | Ovadia et al. |
| 2005/0175341 A1 | 8/2005 | Ovadia |
| 2005/0177749 A1 | 8/2005 | Ovadia |
| 2005/0259571 A1 | 11/2005 | Battou |
| 2006/0008273 A1 | 1/2006 | Xue et al. |

FOREIGN PATENT DOCUMENTS

| | | |
|---|---|---|
| CN | 1406000 | 3/2003 |
| CN | 1426189 | 6/2003 |
| EP | 0876076 | 11/1998 |
| EP | 1073306 | 1/2001 |
| EP | 1073307 | 1/2001 |
| EP | 1089498 | 4/2001 |
| EP | 1122971 | 8/2001 |
| EP | 1135000 | 9/2001 |
| EP | 1217862 | 6/2002 |
| EP | 1303111 | 4/2003 |
| EP | 1351458 | 10/2003 |
| WO | WO 01/19006 | 3/2001 |
| WO | WO 01/67694 | 9/2001 |
| WO | WO 01/76160 | 10/2001 |
| WO | WO 01/86998 | 11/2001 |
| WO | WO 02/41663 | 5/2002 |
| WO | WO 02/067505 | 8/2002 |

OTHER PUBLICATIONS

Yao, Shun et al., "All-Optical Packet Switching for Metropolitan Area Networks: Opportunities and Challenges", IEEE Communications Magazine, Mar. 2001, pp. 142-148.

Qiao, Chunming DR. et al., "Optical Burst Switching", Business Briefing: Global Photonics Applications and Technology, pp. 108-112.

Qiao, Chunming "Labeled Optical Burst Switching for IP-over-WDM Integration", IEEE Communications Magazine, Sep. 2000, pp. 104-114.

Carena, A. et al., "OPERA: An Optical Packet Experimental Routing Architecture with Label Swapping Capability", Journal of Lightwave Technology, vol. 16, No. 12, Dec. 1998, pp. 2135-2145.

Zhong, Wen DE, "A New Wavelength-Routed Photonic Packet Buffer Combining Traveling Delay Lines with Delay-Line Loops", Journal of Lightwave Technology, vol. 19, No. 8, Aug. 2001, pp. 1085-1092.

Wiesmann, D. et al., "Apodized Surface-Corrugated Gratings with Varying Duty Cycles", IEEE Photonics Technology Letters, vol. 12, No. 6, Jun. 2000, pp. 639-640.

Hill, Kenneth O. et al., "Fiber Bragg Grating Technology Fundamentals and Overview", Journal of Lightwave Technology, vol. 15, No. 8, Aug. 1997, pp. 1263-1276.

Erdogan, Turan, "Fiber Grating Spectra", Journal of Lightwave Technology, vol. 15, No. 8, Aug. 1997, pp. 1277-1294.

Sugden, K. et al., "Fabrication and Characterization of Bandpass Filters Based on Concatenated Chirped Faber Gratings", Journal of Lightwave Technology, vol. 15, No. 8, Aug. 1997, pp. 1424-1432.

Giles, C.R., "Lightwave Applications of Fiber Bragg Gratings", Journal of Lightwave Technology, vol. 15, No. 8, Aug. 1997, pp. 1391-1404.

Willner, A. E. et al., "Tunable Compensation of Channel Degrading Effects Using Nonlinearly Chirped Passive Fiber Bragg Gratings", IEEE Journal of Selected Topics in Quantum Electronics, vol. 5, No. 5 Sep./Oct. 1999, pp. 1298-1311.

Studenkov, P. V. et al., "Asymmetric Twin-Waveguide 1.55 μm Wavelength Laser with a Distributed Bragg Reflector", IEEE Photonics Technology Letters, vol. 12., No. 5, May 2000, pp. 468-470.

Shibata, Yasuo et al., "Coupling Coefficient Modulation of Waveguide Grating Using Sampled Grating", IEEE Photonics Technology Letters, vol. 6, No. 10, Oct. 1994, pp. 1222-1224.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Network Working Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Greg Bernstein et al., "OIF UNI 1.0—Controlling Optical Networks", info@oiforum.com, pp. 1-3.

(ABSTRACT), "MPLS Technologies for IP Networking Solution", pp. 1-5.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Khattar, Ravi Kumar et, "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European Transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright © The International Engineering Consortium, Web ProForum Tutorials http://www.iec.org, pp. 1-27.

Floyd, Sally et al., "Modifying TCP's Congestion Control For High Speeds", May 5, 2002, pp. 1-5.

Fredj, Ben S. et al., "Statistical Bandwidth Sharing: A Study of Congestion at Flow Level", France Telecom R&D, pp. 111-122.

Zeljkovic, Nada et al., "A Simulation Analysis of Statistical Multiplexing in Frame Relay and ATM Internworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communitcation", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1x1.5, Jan. 17-20, 2000, pp. 1-4.

"ITU-T Rec. G.709/Y.133—Interfaces for the Optical Transport Network (OTN)," International Telecommunication Union, Mar. 2003, pp. 1-109.

Henderson, Michael P., "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information—2002, Jeju, Korea, 4 pgs.

Cao, Xiaojun et al., "Assembling TCP/IP Packets in Optical Burst Switched Networks", IEEE Global Telecommunications Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

Yoo et al., "Optical Burst Switching for Service differentiation in the Next-Generation Optical Internet," IEEE, Feb. 2001, pp. 98-104.

Guillemot et al., "Transparent Optical Packet Switching: The European ACTS KEOPS Project Approach," IEEE 1998, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

Final Office Action mailed on Oct. 26, 2006. U.S. Appl. No. 10/377,580, filed Feb. 28, 2003, Maciocco et al.

Office Action mailed on Oct. 18, 2006. U.S. Appl. No. 10/459,781, filed Jun. 11, 2003, Ovadia et al.

Office Action mailed on Nov. 14, 2006. U.S. Appl. No. 10/691,712, filed Oct. 22, 2003, Ovadia et al.

Office Action mailed on Nov. 15, 2006. U.S. Appl. No. 10/441,771, filed May 19, 2003, Ovadia et al.

Final Office Action mailed on Nov. 22, 2006. U.S. Appl. No. 10/464,969, filed Jun. 18, 2003, Maciocco et al.

Office Action mailed on Nov. 29, 2006. U.S. Appl. No. 10/417,823, filed Apr. 16, 2003, Ovadia et al.

Office Action mailed on Jan. 3, 2007. U.S. Appl. No. 10/668,874, filed Sep. 23, 2003, Ovadia et al.

Office Action mailed on Dec. 29, 2006. U.S. Appl. No. 10/418,487, filed Apr. 17, 2003, Ovadia et al.

Office Action mailed on Jan. 10, 2007. U.S. Appl. No. 10/636,062, filed Aug. 6, 2003, Maciocco et al.

Final Office Action mailed on Jan. 17, 2007. U.S. Appl. No. 10/606,323, filed Jun. 24, 2003, Maciocco et al.

Final Office Action mailed on Feb. 9, 2007. U.S. Appl. No. 373,312, filed Feb. 28, 2003, Maciocco et al.

Office Action mailed on Feb. 20, 2007. U.S. Appl. No. 10/377,580, filed Feb. 28, 2003, Maciocco et al.

Office Action mailed on Jan. 12, 2007. U.S. Appl. No. 10/242,839, filed Sep. 13, 2002, Ovadia et al.

* cited by examiner

<Path Message> ::=
    <Common Header> ~802
    [ <INTEGRITY> ] ~804
    <UNI_IPv4_SESSION> ~806
    <IPv4_IF_ID_RSVP_HOP> ~808
    <TIME_VALUES> ~810
    [ <EXPLICIT_ROUTE> ] ~811
    <GENERALIZED_PBS_LABEL_REQUEST> ~812
    [ <LABEL_SET> ... ] ~814
    [ < ADMIN_STATUS> ] ~816
    <DESTINATION_PBS_ADDRESS> ~818
    <SOURCE_PBS_ADDRESS > ~820
    [ <POLICY_DATA> ... ] ~822
    <sender descriptor> ~824

*Fig. 8a*  800

Sender descriptor for a unidirectional PBS light-path:

<sender descriptor> ::=
    <LSP_TUNNEL_IPv4_SENDER_TEMPLATE> ~826
    <PBS_SENDER_TSPEC> ~828

*Fig. 8b*  824A

Format of the sender descriptor for a bi-directional PBS light-path

<sender descriptor> ::=
    <LSP_TUNNEL_IPv4_SENDER_TEMPLATE> ~826
    <PBS_SENDER_TSPEC> ~828
    <UPSTREAM_LABEL> ~830

*Fig. 8c*  824B

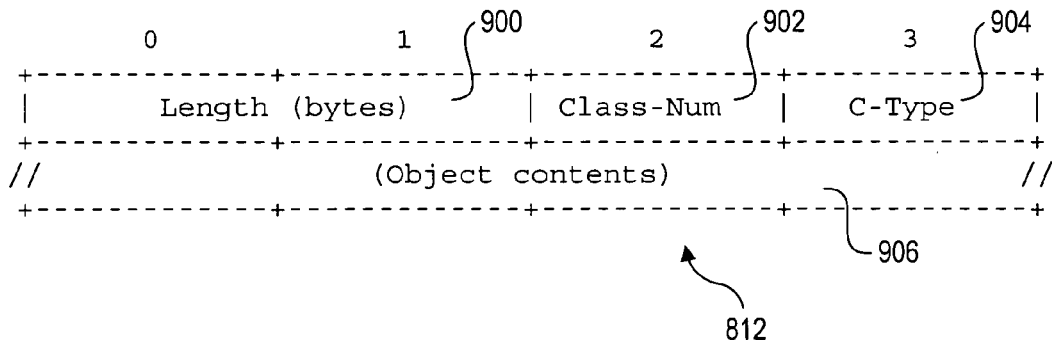
Fig. 9
```
<Resv Message> ::=
        <Common Header> ~802
        [ <INTEGRITY> ] ~804
        <UNI_IPv4_SESSION> ~806
        < IPv4_IF_ID_RSVP_HOP > ~808
        <TIME_VALUES> ~810
        [ <IPv4_RESV_CONFIRM> ] ~1004
        [ <ADMIN_STATUS>] ~816
        [ <POLICY_DATA> ... ] ~822
        <STYLE> ~1006
        <FF flow descriptor> ~1008
```
Fig. 10a
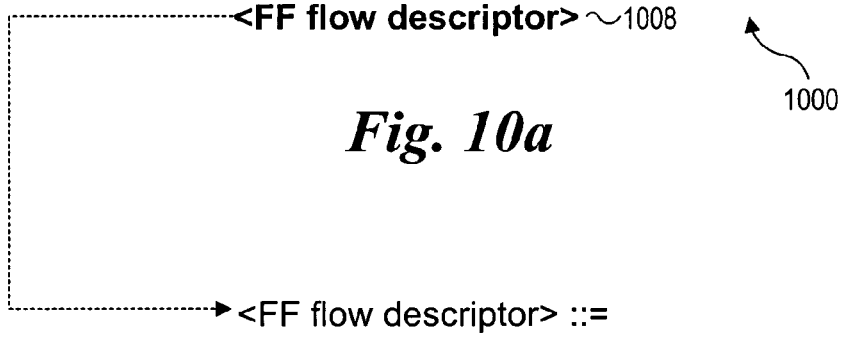
Fig. 10b

```
<PathTear Message> ::=
         <Common Header> ~802
         [ <INTEGRITY> ] ~804
         <UNI_IPv4_SESSION> ~806
         <IPv4_IF_ID_RSVP_HOP> ~808
         [ < ADMIN_STATUS> ] ~816
         <sender descriptor> ~824
```

```
<ResvTear Message> ::=
         <Common Header>~802
         [ <INTEGRITY> ]~804
         <UNI_IPv4_SESSION> ~806
         <IPv4_IF_ID_RSVP_HOP>~808
         [ < ADMIN_STATUS> ]~816
         <STYLE> ~1006
         <FF flow descriptor > ~1008
```

| Lightpath Segment ID | Wavelength | Start Time | End Time | Bandwidth % | Link Status |
|---|---|---|---|---|---|
| LP3 | 195.6 | 12:00:000 | 12:00:001 | 30 | 1 |
| LP4 | 197.2 | 12:00:000 | 12:00:003 | 30 | 1 |
| LP4 | 197.2 | 12:00:001 | 12:00:002 | 35 | 1 |
| LP2 | 196.4 | 12:00:002 | 12:00:003 | 15 | 1 |
| LP13 | 195.6 | 12:00:002 | 12:00:004 | 40 | 1 |
| LP3 | 196.4 | 12:00:002 | 12:00:003 | 10 | 1 |
| LP1 | 197.2 | 12:00:004 | 12:00:006 | 25 | 1 |
| LP3 | 195.6 | 12:00:004 | 12:00:007 | 25 | 1 |
| LP2 | 196.4 | 12:00:005 | 12:00:006 | 20 | 1 |
| LP1 | 195.6 | 12:00:005 | 12:00:007 | 30 | 1 |

LINK_AVAILABILITY TABLE

| Key (Sess ID) | Input Fiber Port | Input Wavelength | Input Lightpath Segment ID | Output Fiber Port | Output Wavelength | Output Lightpath Segment ID | Start Time | End Time | Bandwidth % | Status |
|---|---|---|---|---|---|---|---|---|---|---|
| ... 1005 | 1 | 195.6 | LP1 | 5 | 195.6 | LP3 | 12:00:00 | 12:01:00 | 30 | 1 |
| ... 1027 | 1 | 197.2 | LP1 | 5 | 197.2 | LP4 | 12:00:00 | 12:03:00 | 30 | 1 |
| ... 1045 | 2 | 197.2 | LP2 | 6 | 197.2 | LP4 | 12:01:00 | 12:02:00 | 35 | 1 |
| ... 1115 | 3 | 196.4 | LP3 | 4 | 196.4 | LP2 | 12:02:00 | 12:03:00 | 15 | 1 |
| ... 1146 | 1 | 195.6 | LP1 | 5 | 195.6 | LP13 | 12:02:00 | 12:04:00 | 40 | 1 |
| ... 1178 | 2 | 196.4 | LP2 | 6 | 196.4 | LP3 | 12:02:00 | 12:03:00 | 10 | 1 |
| ... 1222 | 6 | 197.2 | LP4 | 1 | 197.2 | LP1 | 12:04:00 | 12:06:00 | 25 | 1 |
| ... 1256 | 4 | 195.6 | LP3 | 3 | 195.6 | LP3 | 12:04:00 | 12:07:00 | 25 | 0 |
| ... 1313 | 2 | 196.4 | LP2 | 2 | 196.4 | LP2 | 12:05:00 | 12:06:00 | 20 | 0 |
| ... 1345 | 5 | 195.6 | LP13 | 1 | 195.6 | LP1 | 12:05:00 | 12:07:00 | 30 | 0 |

RESERVATION TABLE

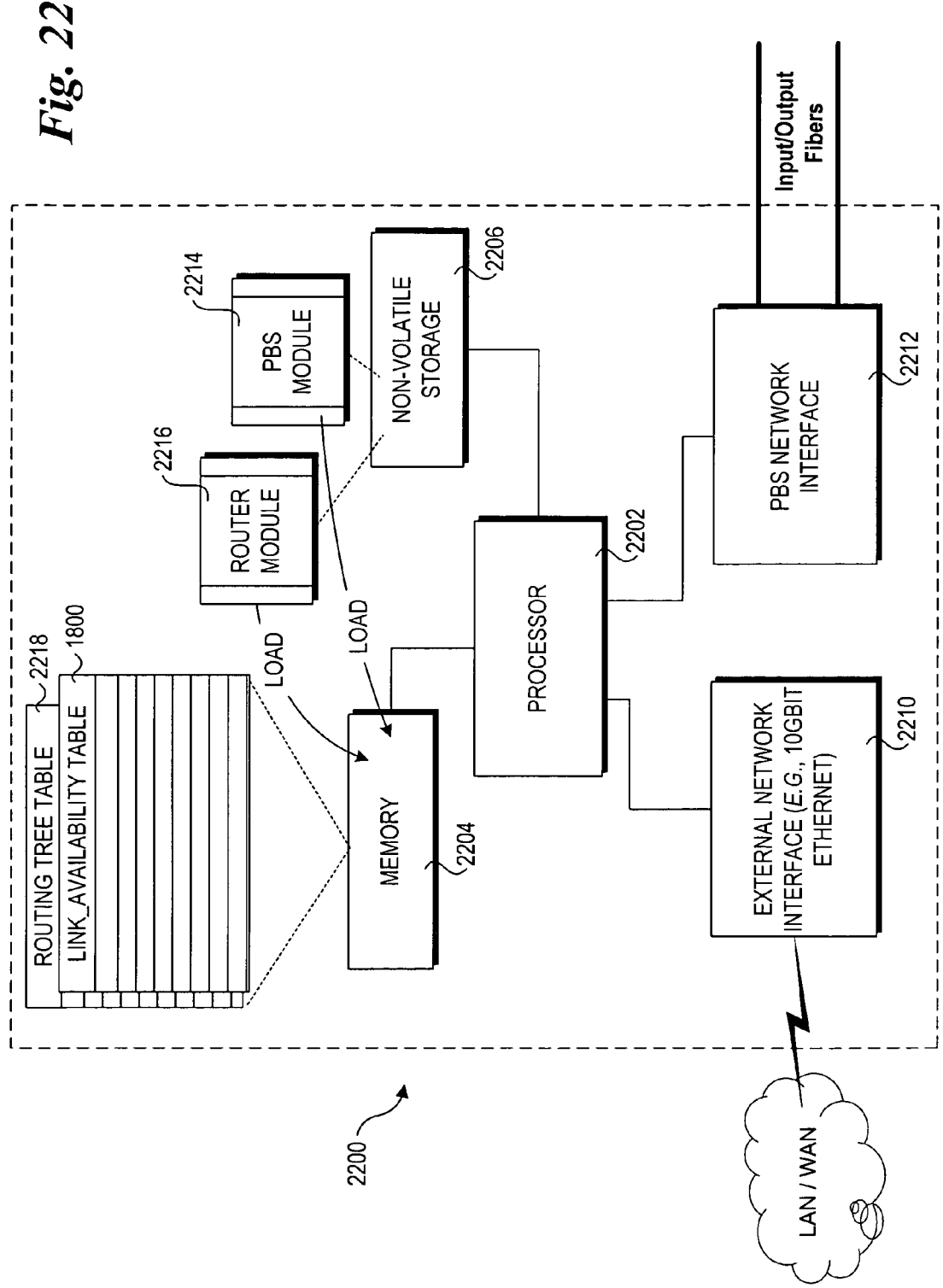

DYNAMIC ROUTE DISCOVERY FOR OPTICAL SWITCHED NETWORKS USING PEER ROUTING

CROSS REFERENCE TO RELATED APPLICATIONS

The present application is related to U.S. patent application Ser. No. 10/126,091, filed Apr. 17, 2002; U.S. patent application Ser. No. 10/183,111, filed Jun. 25, 2002; U.S. patent application Ser. No. 10/328,571, filed Dec. 24, 2002; U.S. patent application Ser. No. 10/377,312 filed Feb. 28, 2003; U.S. patent application Ser. No. 10/377,580 filed Feb. 28, 2003; U.S. patent application Ser. No. 10/417,823 filed Apr. 16, 2003; U.S. patent application Ser. No. 10/417,487 filed Apr. 17, 2003; U.S. patent application Ser. No. 10/441,711 filed May 19, 2003, U.S. patent application Ser. No. 10/464,969 filed Jun. 18, 2003, U.S. patent application Ser. No.10/606,323 filed Jun. 24, 2003, U.S. patent application Ser. No. 10/636,062 filed Aug. 6, 2003, and U.S. patent application Ser. No. 10/691,712 filed Oct. 22, 2003.

FIELD OF THE INVENTION

Embodiments of the present invention relate to optical networks in general; and, more specifically, to techniques for dynamic route discovery for optical-switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology enables the same physical link to transport multiple pieces of data concurrently.

Conventional optical switched networks typically use wavelength routing techniques, which require that optical-electrical-optical (O-E-O) conversion of optical signals be done at the optical switches. O-E-O conversion at each switching node in the optical network is not only a very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. Furthermore, as LAN speeds/bandwidth increase with improved technology, there is a corresponding need for increasing MAN/WAN speeds/bandwidth.

Recently, optical burst switching (OBS) schemes have emerged as a promising solution to support high-speed bursty data traffic over WDM optical networks. The OBS scheme offers a practical opportunity between the current optical circuit-switching and the emerging all optical packet switching technologies. It has been shown that under certain conditions, the OBS scheme achieves high-bandwidth utilization and class-of-service (CoS) by elimination of electronic bottlenecks as a result of the O-E-O conversion occurring at switching nodes, and by using a one-way end-to-end bandwidth reservation scheme with variable time slot duration provisioning scheduled by the ingress nodes. Optical switching fabrics are attractive because they offer at least one or more orders of magnitude lower power consumption with a smaller form factor than comparable O-E-O switches. However, most of the recently published work on OBS networks focuses on the next-generation backbone data networks (i.e. Internet wide network) using high capacity (i.e., 1 Tb/s) WDM switch fabrics with a large number of input/output ports (i.e., 256×256), optical channels (i.e., 40 wavelengths), and requiring extensive buffering. Thus, these WDM switches tend to be complex and very expensive to manufacture. In contrast, there is a growing demand to support a wide variety of bandwidth-demanding applications such as storage area networks (SANs) and multimedia multicast at a low cost for both local and wide-area networks.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 8a, 8b, and 8c are data structures corresponding to an RSVP-TE-based Path message including extensions to support a coarse-grain resource reservation mechanism in accordance with one embodiment of the invention.

FIG. 9 is a data structure corresponding to a generalized PBS label request object of the Path message data structure of FIG. 8a.

FIGS. 10a, and 10b are data structures corresponding to an RSVP-TE-based Resv message including extensions to support the coarse-grain resource reservation mechanism in accordance with one embodiment of the invention.

FIG. 22 is a schematic diagram of a BGP router with co-located PBS label edge router node architecture, according to one embodiment of the invention.

DETAILED DESCRIPTION OF PREFERRED EMBODIMENTS

In the following detailed descriptions, embodiments of the invention are disclosed with reference to their use in a photonic burst-switched (PBS) network. A PBS network is a type of optical switched network, typically comprising a high-speed hop and span-constrained network, such as an enterprise network. The term "photonic burst" is used herein to refer to statistically-multiplexed packets (e.g., Internet protocol (IP) packets or Ethernet frames) having similar routing requirements. Although conceptually similar to backbone-based OBS networks, the design, operation, and performance requirements of these high-speed hop and span-constrained networks may be different. However, it will be understood that the teaching and principles disclosed herein may be applicable to other types of optical switched networks as well.

Figure 1:
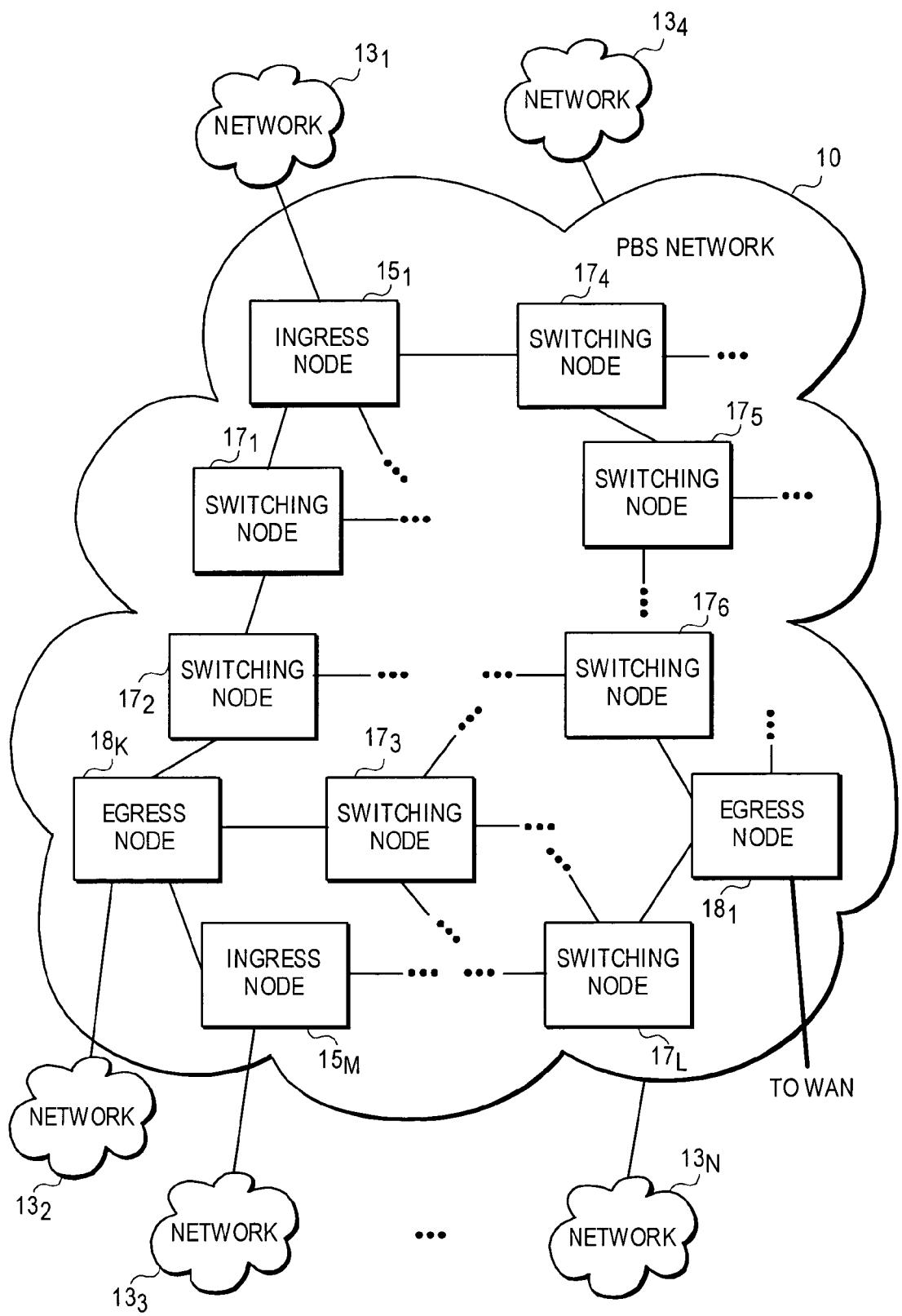
FIG. 1 is a simplified block diagram illustrating a photonic burst-switched (PBS) network with variable time slot provisioning, according to one embodiment of the present invention.

FIG. 1 illustrates an exemplary photonic burst-switched (PBS) network 10 in which embodiments of the invention described herein may be implemented. This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band (OOB) signaling). In other embodiments, control and data information may be sent on the same wavelengths (also referred to herein as in-band (IB) signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
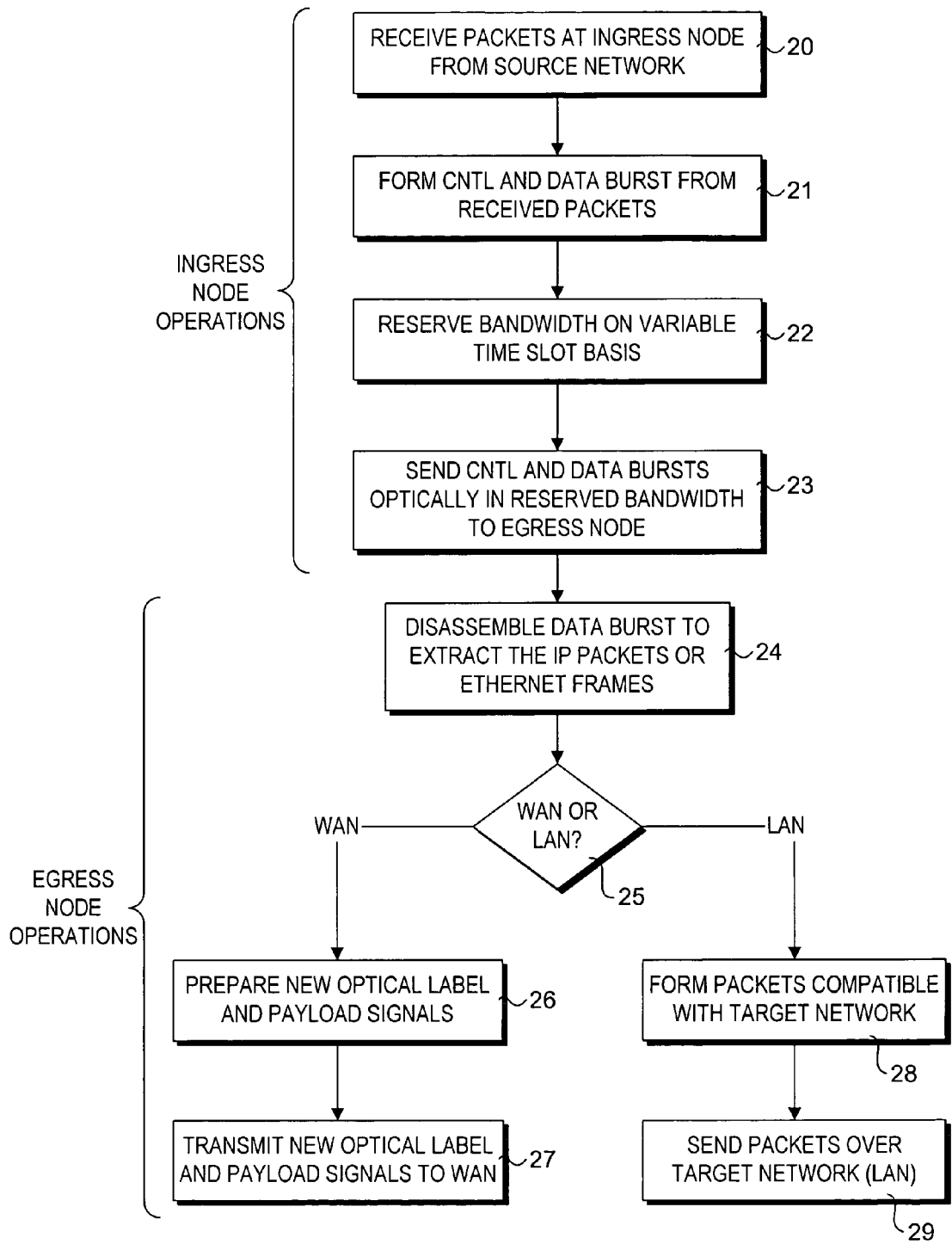
FIG. 2 is a simplified flow diagram illustrating the operation of a photonic burst-switched (PBS) network, according to one embodiment of the present invention.

FIG. 2 illustrates the operational flow of PBS network 10, according to one embodiment of the present invention. Referring to FIGS. 1 and 2, photonic burst switching network 10 operates as follows.

The process begins in a block 20, wherein PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically.

For clarity, the rest of the description of the operational flow of PBS network 10 focuses on the transport of information from ingress node $15_1$ to egress node 181. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets, as depicted by a block 21. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload.

Next, in a block 22, Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), which in different embodiments may be of fixed-duration or variable-duration, may be in one wavelength of one fiber, and/or can be spread across multiple wavelengths and multiple optical fibers.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes.

The optical control bursts, network management control labels, and optical data bursts are then transported through photonic burst switching network 10 in the reserved time slot or TDM channel, as depicted by a block 23. In one embodiment, ingress node $15_1$ transmits the control burst to the next node along the optical label-switched path (OLSP) determined by the network controller. In this embodiment, the network controller uses a constraint-based routing protocol [e.g., multi-protocol label switching (MPLS)] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$.

The remaining set of operations pertains to egress node operations. Upon receiving the data burst, the egress node disassembles it to extract the IP packets or Ethernet frames in a block 24. In one embodiment, egress node $18_1$ converts the optical data burst to electronic signals that egress node $18_1$ can process to recover the data segment of each of the packets. The operational flow at this point depends on whether the target network is an optical WAN or a LAN, as depicted by a decision block 25.

If the target network is an optical WAN, new optical label and payload signals are formed in a block 26. In this embodiment, egress node $18_1$ prepares the new optical label and payload signals. The new optical label and payload are then transmitted to the target network (i.e., WAN in this case) in a block 27. In this embodiment, egress node $18_1$ includes an optical interface to transmit the optical label and payload to the optical WAN.

However, if in block 25 the target network is determined to be a LAN, the logic proceeds to a block 28. Accordingly, the extracted IP data packets or Ethernet frames are processed, combined with the corresponding IP labels, and then routed to the target network (i.e., LAN in this case). In this embodiment, egress node 18, forms these new IP packets. The new IP packets are then transmitted to the target network (i.e., LAN) as shown in block 29.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Figure 3:
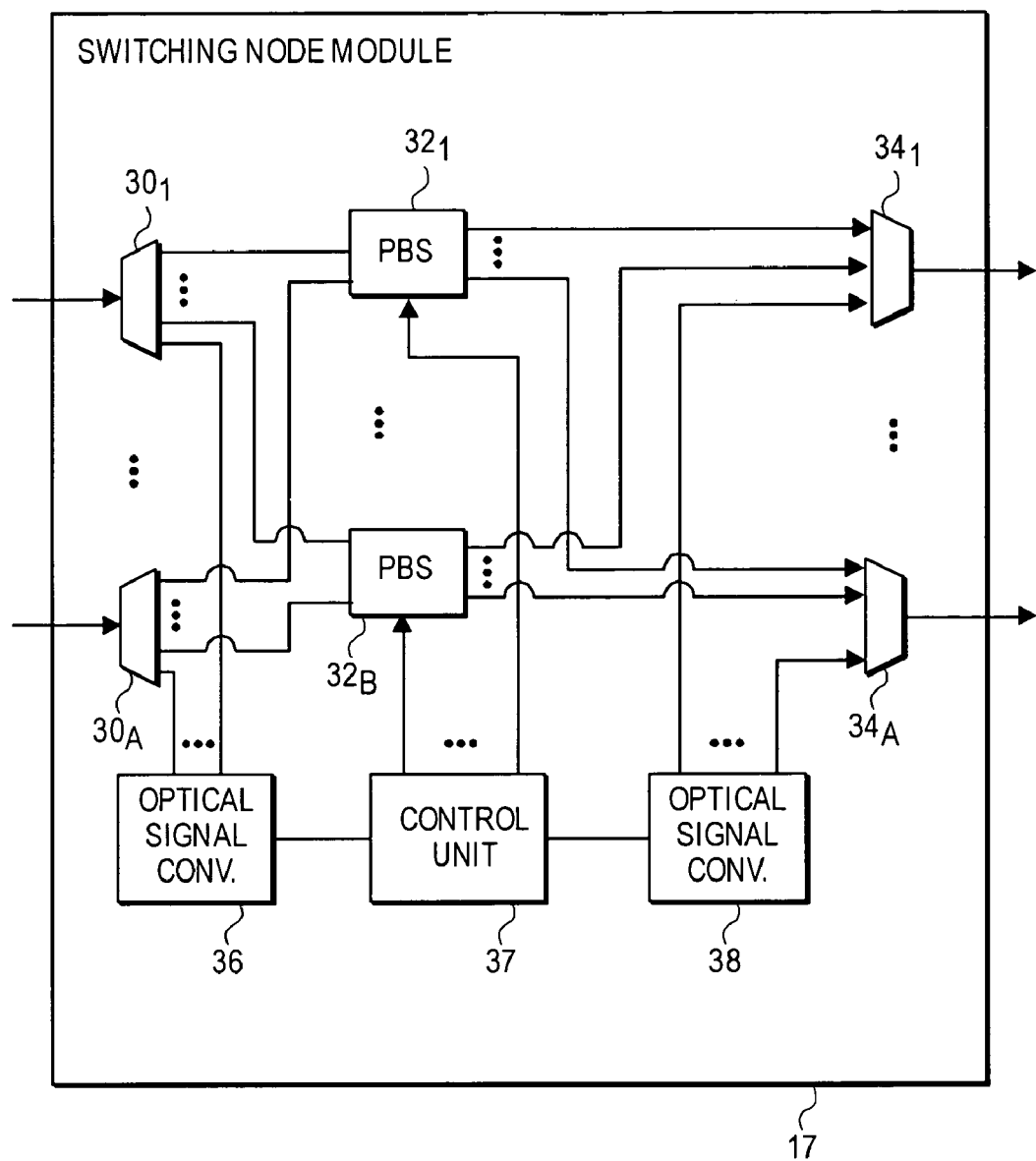
FIG. 3 is a block diagram illustrating a switching node module for use in a photonic burst-switched (PBS) network, according to one embodiment of the present invention.

FIG. 3 illustrates a module 17 for use as a switching node in photonic burst switching network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs. Further details of control unit 37 are described below.

The elements of this embodiment of module 17 are interconnected as follows. Optical demultiplexers $30_1$-$30_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch 32, to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38.

Figure 4:
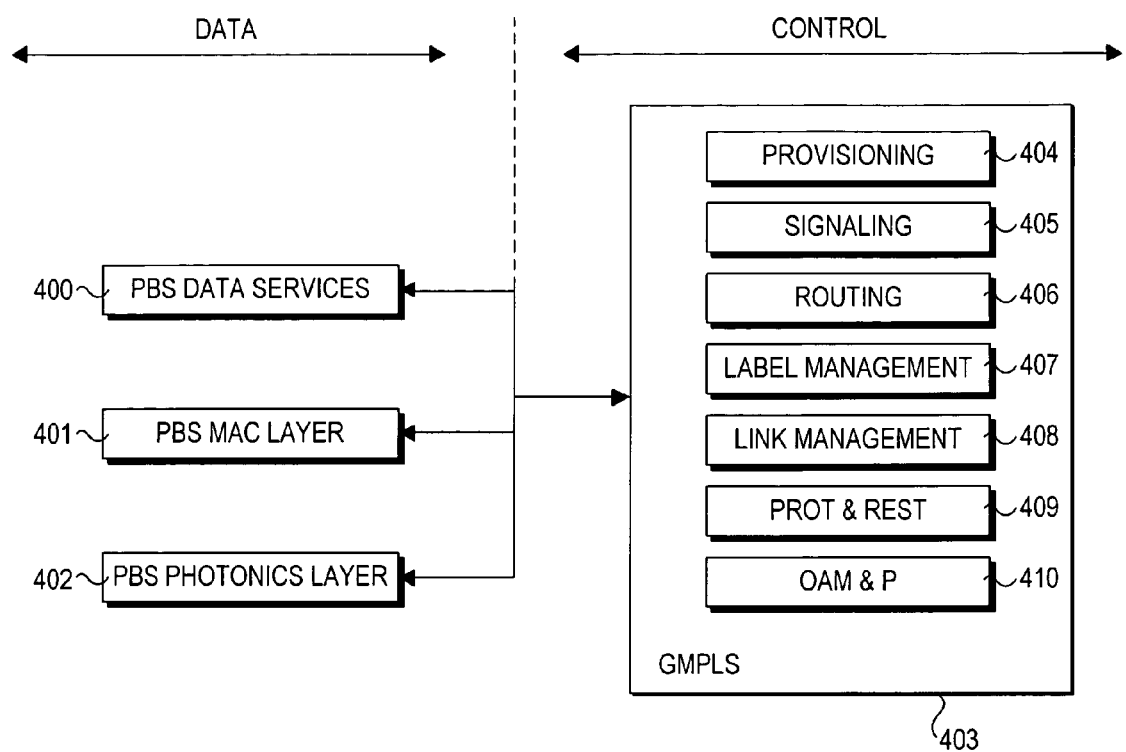
FIG. 4 is a diagram illustrating a generalized multi-protocol label switching (GMPLS)-based architecture for a PBS network, according to one embodiment of the present invention.

In accordance with further aspects of the invention, a dynamically-routed OLSP scheduling mechanism employing signaling extensions to a GMPLS-based framework for a PBS network is provided. An overview of a GMPLS-based control scheme for a PBS network in which the signaling extensions may be implemented in accordance with one embodiment is illustrated in FIG. 4. Starting with the GMPLS suite of protocols, each of the GMPLS protocols can be modified or extended to support PBS operations and optical interfaces while still incorporating the GMPLS protocols' various traffic-engineering tasks. The integrated PBS layer architecture include PBS data services layer 400 on top of a PBS MAC layer 401, which is on top of a PBS photonics layer 402. It is well known that the GMPLS-based protocols suite (indicated by a block 403 in FIG. 4) includes a provisioning component 404, a signaling component 405, a routing component 406, a label management component 407, a link management component 408, and a protection and restoration component 409. In some embodiments, these components are modified or have added extensions that support the PBS layers 400-402. Further, in this embodiment, GMPLS-based suite 403 is also extended to include an operation, administration, management and provisioning (OAM&P) component 410. Further information on GMPLS architecture can be found at http://www.ietf.org/internet-drafts/draft-ietf-ccamp-gmpls-architecture-07.txt. In addition, a functional description of basic GMPLS signaling can be found at http://www.ietf.org/rfc/rfc3471.txt.

In accordance with one aspect of the invention, signaling component 405 can include extensions specific to PBS networks such as, for example, burst start time, burst type, burst length, and burst priority, etc. As described in further detail below, GMPLS signaling extensions are disclosed for enabling reservation scheduling using the RSVP-TE (ReSerVation Protocol—Traffic Engineering) protocol. Link management component 408 can be implemented based on the well-known link management protocol (LMP) (that currently supports only SONET/SDH networks), with extensions added to support PBS networks. Protection and restoration component 409 can, for example, be modified to cover PBS networks. Further information on LMP can be found at http://www.ietf.org/internet-drafts/draft-ietf-ccamp-lmp-09.txt.

Label management component 407 can be modified to support a PBS control channel label space as well. In one embodiment, the label operations are performed after control channel signals are O-E converted. The ingress nodes of the PBS network act as label edge routers (LERs) while the switching nodes act as label switch routers (LSRs). An egress node acts similarly to an egress LER, continuously providing labels for the PBS network. An ingress node can propose a label to be used on the lightpath segment it is connected to, but the downstream switching node will be the node that ultimately selects a label value, potentially rejecting the proposed label and selecting its own label. In general, a label list can also be proposed by an edge or switching node to its downstream switching node. This component can advantageously increase the speed of control channel context retrieval (by performing a pre-established label look-up instead of having to recover a full context). Further details of label configuration and usage are discussed in co-pending U.S. patent application Ser. No. 10/606,323.

To enable PBS networking within hop and span-constrained networks, such as enterprise networks and the like, it is advantageous to extend the GMPLS-based protocols suite to recognize the PBS optical interfaces at both ingress/egress nodes and switching nodes. Under the GMPLS-based framework, the PBS MAC layer is tailored to perform the different PBS operations while still incorporating the MPLS-based traffic engineering features and functions for control burst switching of coarse-grain (from seconds to days or longer) optical flows established using a reservation protocol and represented by a PBS label.

Figure 5:
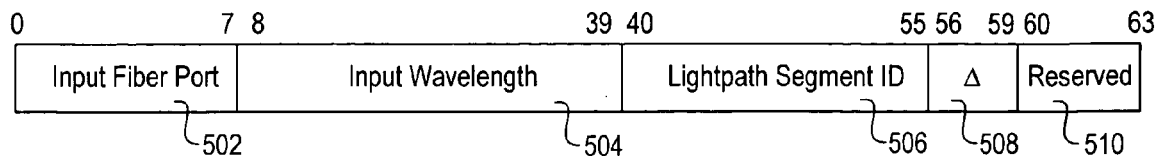
FIG. 5 is a block diagram illustrating GMPLS-based PBS label format, according to one embodiment of the present invention.

In important aspect of the present invention pertains to label signaling, whereby coarse-grain lightpaths are signaled end-to-end and assigned a unique PBS label. The PBS label has only lightpath segment significance and not end-to-end significance. In exemplary PBS label format 500 is shown in FIG. 5 with its corresponding fields, further details of which are discussed below. The signaling of PBS labels for lightpath set-up, tear down, and maintenance is done through an extension of IETF (Internet Engineering Task Force) Resource Reservation Protocol-Traffic Engineering (RSVP-TE). More information on GMPLS signaling with RSVP-TE extensions can be found at http://www.ietf.org/rf/rfc3473.txt.

The PBS label, which identifies the data burst input fiber, wavelength, and lightpath segment, optical channel spacing, is used on the control path to enable one to make soft reservation request of the network resources (through corresponding Resv messages). If the request is fulfilled (through the Path message), each switching node along the selected lightpath commits the requested resources, and the lightpath is established with the appropriate segment-to-segment labels. Each switching node is responsible for updating the initial PBS label through the signaling mechanism, indicating to the previous switching node the label for its lightpath segment. If the request cannot be fulfilled or an error occurred, a message describing the condition is sent back to the originator to take the appropriate action (i.e., select another lightpath characteristics). Thus, the implementation of the PBS label through signaling enables an efficient MPLS type lookup for the control burst processing. This processing improvement of the control burst at each switching node reduces the required offset time between the control and data bursts, resulting in an improved PBS network throughput and reduced end-to-end latency.

In addition to the software blocks executed by the PBS control processor, there are several other key components that support PBS networking operations described herein. Link Management component 408 is responsible for providing PBS network transport link status information such as link up/down, loss of light, etc. The component runs its own link management protocol on the control channel. In one embodiment, the IETF link management protocol (LMP) protocol is extended to support PBS interfaces. Link protection and restoration component 409 is responsible for computing alternate optical paths among the various switching nodes based on various user-defined criteria when a link failure is reported by the link management component. OAM&P component 410 is responsible for performing various administrative tasks such as device provisioning.

Additionally, routing component 406 provides routing information to establish the route for control and data burst paths to their final destination. For PBS networks with bufferless switch fabrics, this component also plays an important role in making PBS a more reliable transport network by providing backup route information that is used to reduce contention.

The label signaling scheme of the present invention reduces the PBS offset time by reducing the amount of time it takes to process a signaled lightpath. This is achieved by extending the GMPLS-based framework to identify each lightpath segment within the PBS network using a unique label defined in a PBS label space. The use of a PBS label speeds up the PBS control burst processing by allowing the control interface unit within the PBS switching node, which processes the control burst, to lookup relevant physical routing information and other relevant processing state based on the label information used to perform a fast and efficient lookup. Thus, each PBS switching node has access in one lookup operation to the following relevant information, among others: 1) the address of the next hop to send the control burst to; 2) information about the outgoing fiber and wavelength; 3) label to use on the next segment if working in a label-based mode; and 4) data needed to update the scheduling requirement for the specific input port and wavelength.

Returning to FIG. 5, in one embodiment PBS label 500 comprises five fields, including an input fiber port field 502, an input wavelength field 504, a lightpath segment ID field 506, an optical channel spacing ($\Delta$) field 508, and a reserved field 510. The input fiber port field 502 comprises an 8-bit field that specifies the input fiber port of the data channel identified by the label (which itself is carried on the control wavelength. The input wavelength field 504 comprises a 32-bit field that describes the input data wavelength used on the input fiber port specified by input fiber port field 502, and is described in further detail below. The lightpath segment ID field 506 comprises a 16-bit field that describes the lightpath segment ID on a specific wavelength and a fiber cable. Lightpath segment ID's are predefined values that are determined based on the PBS network topology. The channel spacing field 508 comprises a 4-bit field used for identifying the channel spacing (i.e., separation between adjacent optical channels) in connection with the $\Delta$ variable defined below. The reserved field 510 is reserved for implementation-specific purposes and future expansion.

In one embodiment, the input wavelength is represented using IEEE (Institute of Electrical and Electronic Engineers) standard 754 for single precision floating-point format. The 32-bit word is divided into a 1-bit sign indicator S, an 8-bit biased exponent e, and a 23-bit fraction. The relationship between this format and the representation of real numbers is given by:

$$\text{Value} = \begin{cases} (-1)^S \cdot (2^{e-127}) \cdot (1+f) & \text{normalized, } 0 < e < 255 \\ (-1)^S \cdot (2^{e-126}) \cdot (0+f) & \text{denormalized, } e = 0, f > 0 \\ \text{exceptional value} & \text{otherwise} \end{cases} \quad \text{Eq. (1)}$$

One of the optical channels in the C band has a frequency of 197.200 THz, corresponding to a wavelength of 1520.25 nm. This channel is represented by setting s=0, e=134, and f=0.540625. The adjacent channel separation can be 50 GHz, 100 GHz, 200 GHz, or other spacing. For 50 GHz channel separation, it can be written as: Δ=0.05=1.6·2⁻⁵ (s=0, e=122, f=0.6). Thus, the frequency of the nth channel is given by:

$$f(n) = f(1) - (n-1) \cdot \Delta \quad \text{Eq. (2)}$$

Thus, according to equation (2), the optical channel frequency is given by n and the specific value of Δ, which can be provided as part of the initial network set-up. For example, using the standard ITU-T (International Telecommunications Union) grid C and L bands, n is limited to 249, corresponding to an optical frequency of 184.800 THz. However, other optical channel frequencies outside the above-mentioned range or other wavelength ranges such as wavelength band around 1310 nm can be also defined using equation (2).

Figure 6:
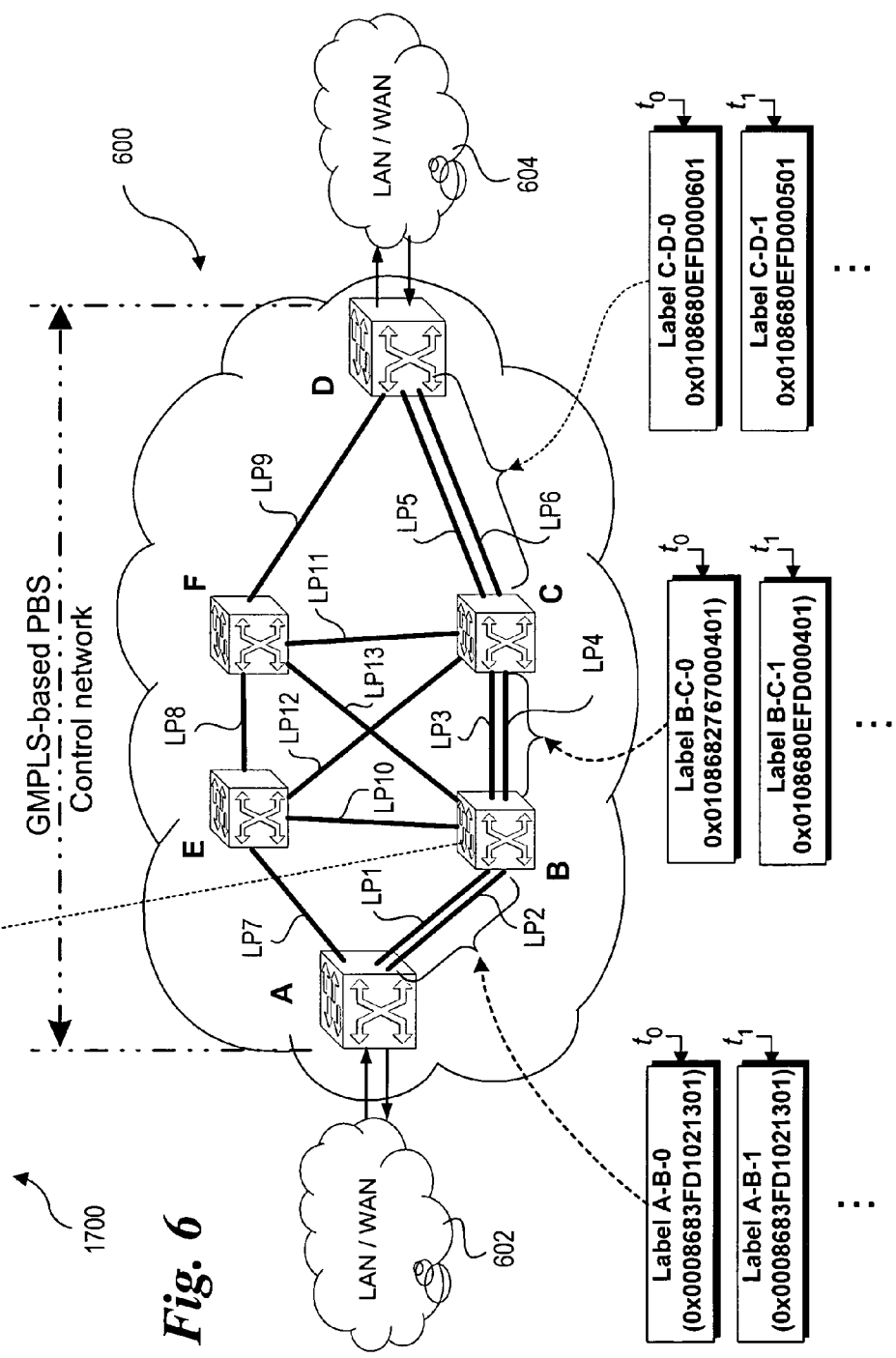
FIG. 6 is a schematic diagram illustrating an exemplary set of GMPLS-based PBS labels employed in connection with routing data across a GMPLS-based PBS control network.

Operation of how PBS label 500 is implemented in a GMPLS-based PBS network 6500 is illustrated in FIG. 6. Network 600, which may comprise one of various types of networks, such as an enterprise network, contains four PBS switching nodes, labeled B, C, E, and F, and two edge nodes labeled A and D. Network 600 is coupled at one end to a LAN or WAN network 602 and a LAN or WAN network 604 at another end, wherein nodes A and D operate as edge nodes. For the following example, it is desired to route traffic from network 602 to network 604. Accordingly, edge node A (i.e., the source node) operates as an ingress node, while edge node D (i.e., the destination node) operates as an egress node.

The various switching nodes B, C, E, and F are coupled by lightpath segments LP1-LP13, as shown in FIG. 6. A lightpath segment comprises an optical connection via optical fibers between any adjacent nodes. A lightpath comprises the optical path traveled between source and destination nodes, and typically will comprises a concatenation of a plurality of lightpath segments. In the illustrated example discussed below, one of the lightpaths between the source node (ingress node A) and the destination node (egress node D) comprises lightpath segments LP1, LP4, and LP6.

As further shown in FIG. 6, exemplary PBS labels A-B-0 and A-B-1 are assigned to the path between nodes A and B at times $t_0$ and $t_1$, respectively; labels B-C-0 and B-C-1 are assigned to the path between nodes B and C nodes at times $t_0$ and $t_1$; and labels C-D-0 and C-D-1 are assigned to the path between nodes C and D nodes at times $t_0$ and $t_1$. For the purpose of simplicity, the lightpath segment ID's for lightpath segments LP1, LP2, LP3, LP4, LP5 and LP6 are respectively defined as 0x0001, 0x0002, 0x0003, 0x0004, 0x0005, and 0x0006. In accordance with foregoing aspects of PBS networks, a particular LSP may comprise lightpath segments employing a single wavelength, or different wavelengths. For example, in the illustrated example, label A-B-0 defines the use of an optical frequency of 197.2 THz (0x08683FD1), label B-C-0 defines the use of a frequency of 196.4 THz (0x08682767), and label C-D-0 defines the use of a frequency of 195.6 THz (0x08680EFD). On the way from A to D the signaling packet requests resource reservation on a lightpath segment-by-segment basis (i.e. LP1, LP4, and LP6). For example, edge node A requests resources to create a coarse-grain reservation of a selected lightpath. On the first lightpath segment, switching node B checks if it has sufficient resources to satisfy the request. If it doesn't have the resources, it sends an error message back to the originator of the request to take the appropriate action such as send another request or select another lightpath. If it has enough resources, it makes a soft reservation of these resources, and forwards it to the next switching node, wherein the operations are repeated until the destination node D is reached. When node D receives the soft reservation request, it checks if it can be fulfilled.

To support reservation signaling, a signaling mechanism is implemented that employs extensions to the Resource reSerVation Protocol-Traffic Engineering (RSVP-TE). In general, the RSVP-TE protocol is itself an extension of the RSVP protocol, as specified in IETF RFC 2205. RSVP was designed to enable the senders, receivers, and routers of communication sessions (either multicast or unicast) to communicate with each other in order to set up the necessary router state to support various IP-based communication services. RSVP identifies a communication session by the combination of destination address, transport-layer protocol type, and destination port number. RSVP is not a routing protocol, but rather is merely used to reserve resources along an underlying route, which under conventional practices is selected by a routing protocol.

Figure 7:
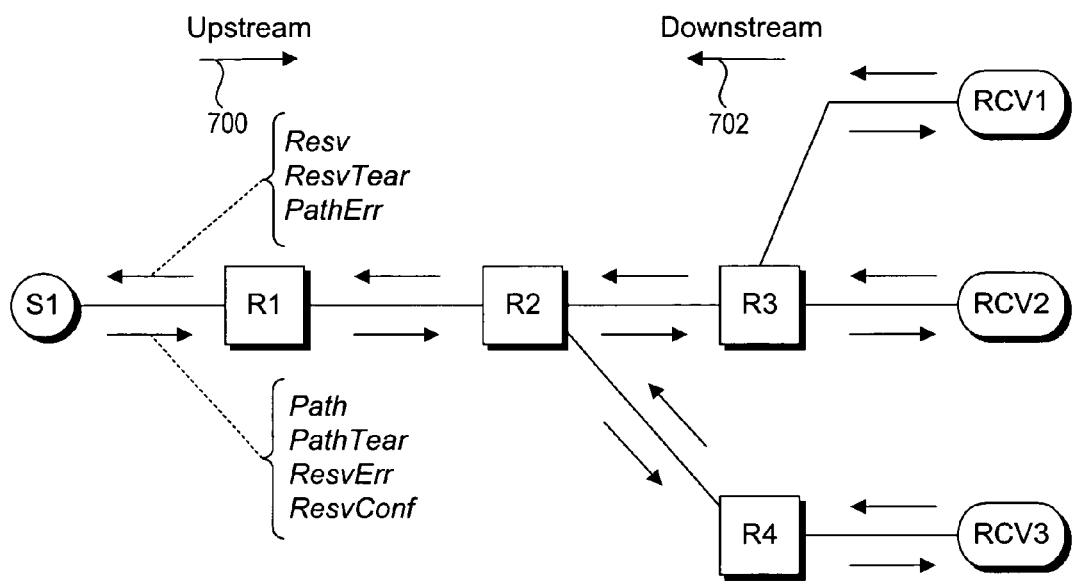
FIG. 7 is a block diagram illustrating message flows in connection with RSVP messages.

FIG. 7 shows an example of RSVP for a multicast session involving one traffic sender S1, and three traffic receivers, RCV1, RCV2, and RCV3. The diagram in FIG. 7 is illustrative of the general RSVP operations, which may apply to unicast sessions as well. Upstream messages 700 and downstream messages 702 sent between sender S1 and receivers RCV1, RCV2, and RCV3 are routed via routing components (e.g., switching nodes) R1, R2, R3, and R4. The primary messages used by RSVP are the Path message, which originates from the traffic sender, and the Resv message, which originates from the traffic receivers. The primary roles of the Path message are first to install reverse routing state in each router along the path, and second to provided receivers with information about the characteristics of the sender traffic and end-to-end path so that they can make appropriate reservation requests. The primary role of the Resv message is to carry reservation requests to the routers along the distribution tree between receivers and senders.

Connection creations requests are issued via a Path message. Details of a Path message 800 with signaling extensions in accordance with an embodiment of the invention is shown in FIGS. 8*a*-*c*. For clarity, Path message 800 only shows fields that are pertinent to reservation signaling mechanism described herein; it will be understood that the Path message may further include additional fields specified by the RSVP-TE protocol. Also for clarity, fields that are augmented or added to the standard RSVP-TE data structures are shown in bold. Finally, objects contained in square brackets ([. . . ]) are optional.

The illustrated objects of Path message 800 include a Common Header 802, an optional Integrity object 804, a Session object 806, an RSVP_Hop object 808, a Time_Values object 810, an optional Explicit_Route object 811, a generalized PBS_Label_Request object 812, an optional Label_Set object 814, an optional Admin_Status object 816, a Destination_PBS_address object 818, a Source_PBS_Address object 820, an optional Policy_Data object 822, and a sender descriptor object 824.

The optional Integrity object 804 carries cryptographic data to authenticate the originating node and to verify the contents of the RSVP message. The Session object 806 contains the IP destination address (Dest Address), the IP protocol ID, and some form of generalized destination port, to define a specific session for the other objects to follow. In one embodiment, the information identifying an Internet Protocol version 4 (IPv4) session, is stored in Session object 806. Optionally, Internet Protocol version 6 (IPv6) may be employed.

RSVP_Hop object 808 carries the IP address of the RSVP-capable node that sent the message (the most recent in the chain of nodes) and a logical outgoing interface handle LIH. RSVP_Hop objects for downstream messages are known as PHOP ("previous hop") objects, while upstream RSVP_Hop objects are known as NHOP ("next hop") objects. Thus PHOP RSVP_Hop objects are labeled 808P, while NHOP RSVP_Hop objects are labeled 808N herein.

Under conventional practice, Time_Values object 810 would contain the value for the refresh period used by the creator of the message. However, in accordance with principles of the invention, the object is used to store time values specifying the start and end of an OLSP reservation.

The signaling protocol also supports explicit routing. This is accomplished via the explicit route object 811. This object encapsulates a concatenation of hops that constitute the explicitly routed path. Using the object, the paths taken by label-switched RSVP-MPLS flows can be pre-determined, independent of conventional IP routing. The explicitly routed path can be administratively specified, or automatically compute by a suitable entity based on QoS (Quality of Service) and policy requirements, taking into consideration the prevailing network state. In general, path computation can be control-driven or data-driven.

Details of a generalized PBS_Label_Request object 812 format in accordance with one embodiment are shown in FIG. 9. The object's format includes a length field 900, a Class-Num field 902, a C-Type field 904, and object contents 906. The values in both Class-Num field 902 and C-Type field 904 are constants that are standardized once a protocol goes through the standard track. In one embodiment, object contents 906 include a PBS label having a format shown in FIG. 5 and described above.

The Label_Set object 814 is used to limit the label choices of a downstream node to a set of acceptable labels. This limitation applies on a per hop basis. RFC 3271 discusses four cases where a label set is useful in the optical domain. The first case is where the end equipment is only capable of transmitting on a small specific set of wavelengths/bands. The second case is where there is a sequence of interfaces that cannot support wavelength conversion (CI-incapable) and require the same wavelength be used end-to-end over a sequence of hops, or even an entire path. The third case is where it is desirable to limit the amount of wavelength conversion being performed to reduce the distortion on the optical signals. The last case is where two ends of a link support different sets of wavelengths.

The Label_Set object 814 is used to restrict label ranges that may be used for a particular LSP between two peers. The receiver of a Label_Set must restrict its choice of labels to one which are specified in the Label_Set 814. Much like a label, a Label_Set 814 may be present across multiple hops. In this case each node generates its own outgoing Label_Set, possibly based on the incoming Label_Set and the node's hardware capabilities. This case is expected to be the norm for nodes with conversion-incapable (CI-incapable) interfaces. The use of the Label_Set 814 is optional; if not present, all labels from the valid label range may be used. Conceptually the absence of a specific Label_Set object implies a Label_Set object whose value is {U}, the set of all valid labels.

The Admin_Status object 816 is used to notify each node along the path of the status of an LSP. Status information is processed by each node based on local policy and the propagated in the corresponding outgoing messages. The object may be inserted in either Path or Resv messages at the discretion of the ingress (for Path messages) or egress (for Resv messages) nodes.

The Destination_PBS_Address object 818 contains the IP address of the destination node (i.e., the egress node). As discussed above, this information may be provided in the session object; for clarity it is shown as separate data in FIG. 8a. Similarly, the Source_PBS_Address object 820 contains the IP address of the source node (i.e., the ingress node).

Further details of sender descriptor 824 for unidirectional and bidirectional PBS light paths are respectively shown in FIGS. 8a and 8b. FIG. 8a shows a unidirectional sender descriptor 824A that includes a sender template object 826 and a PBS_Sender_TSpec object 828. The bidirectional sender descriptor 824B further includes an upstream label 830 in addition to a sender template object 826 and a PBS_Sender_TSpec object 828.

FIGS. 10a and 10b illustrate the various objects of a Resv message 1000 in accordance with one embodiment. As with conventional RSVP practice, a Resv message is issued by a receiving node in response to a Path message. Accordingly, Resv message 1000 shares many object with Path message 800, including a common header 802, Integrity object 804, Session object 806, RSVP_Hop object 808, Time_Values object 810, Admin_Status object 816, and Policy_Data object 822. In addition, Resv message 1000 a reservation configuration object 1004, a Style object 1006, and a flow descriptor object 1008.

Reservation confirmation object (Resv_Confirm) 1004 holds data that is used to confirm a reservation for a corresponding PBS resource. Further details of resource reservations are described below. Style object 1006 contains data identifying the reservation style, i.e., FF (Fixed Filter—distinct reservation and explicit sender selection), SE (Shared Explicit—shared reservation and explicit sender selection), and WF (Wildcard Filter—shared reservation and wildcard sender selection).

Flow descriptor 1008 contains objects for describing data flows. These objects include a PBS_Flowspec 1010, a Filter_Spec 1012, and a Generalized_PBS_Label 1014.

Figures 11, 12, 13:
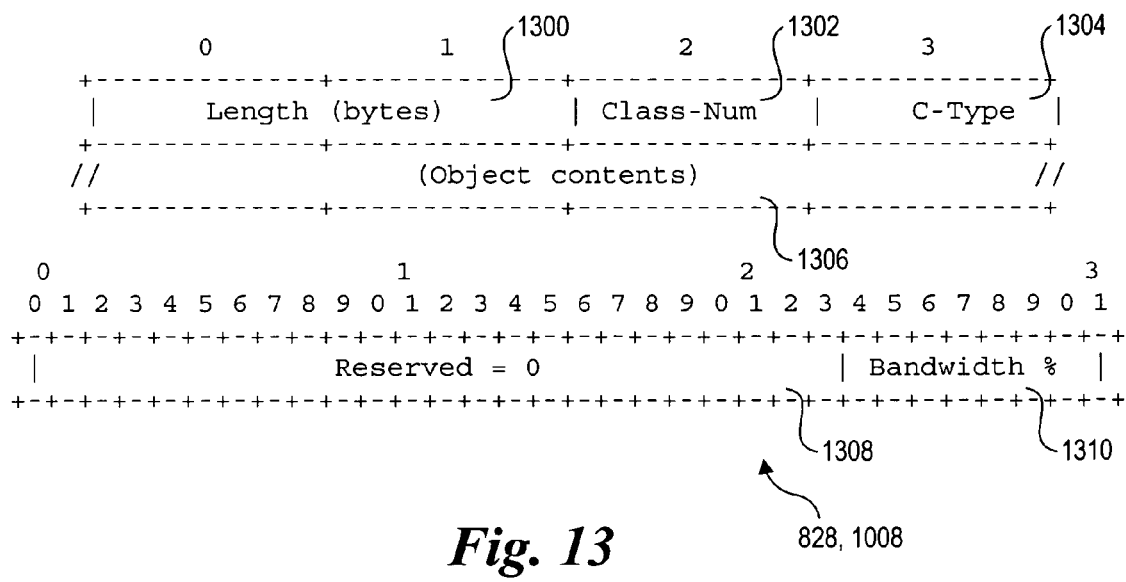
FIG. 11 is a data structure corresponding to an RSVP-TE-based PathTear message including extensions to support tear down of resource reservations in accordance with one embodiment of the invention.
FIG. 12 is a data structure corresponding to an RSVP-TE-based ResvTear message including extensions to support tear down of resource reservations in accordance with one embodiment of the invention.
FIG. 13 is diagram illustrating a data structure corresponding to a sender descriptor object and a flow descriptor object that includes a field containing a bandwidth % value used to request reservation of resources supporting a % of the bandwidth provided by such resources.

A PathTear message 1100 employed to request the deletion of a connection is shown in FIG. 11. The PathTear message 1100 includes objects that are corollary with Path message 800. These objects include a Common Header 802, an optional Integrity object 804, a Session object 806, an RSVP_Hop object 808, and optional Admin_Status 816, and a sender descriptor 824.

A ResvTear message 1200 issued in response to a PathTear message 1100 is shown in FIG. 12. The ResvTear message 1200 includes a Common Header 802, an optional Integrity object 804, a Session object 806, an RSVP_Hop object 808, and optional Admin_Status 816, a Style object 1006, and a flow descriptor 1200.

A common format is employed for PBS_Sender_TSpec object 828 and PBS_Flowspec object 1010. Each object includes a length field 1300, a Class-Num field 1302, a C-Type field 1304, object contents 1306, a reserved field 1308, and a bandwidth % field 1310. PBS_Send_TSpec objects 828 and PBS_Flowspec objects 1010 can be identified by their respective Class-num/C-Type values. The value in bandwidth % field 1310 represents the amount of bandwidth expressed by the intermediate node as a percent of the available bandwidth on a given lightpath segment. An intermediate node (i.e., a switching node) normalizes this percentage to the available bandwidth of its outgoing link. This enables each of the switching nodes to build-up its bandwidth allocation table for all the incoming label requests and determine if it can satisfy each bandwidth request. ps Peer Routing In a dynamic routing embodiment known as "peer-to-peer" (or simply "peer") routing, resource availability information is dynamically updated in response to resource reservations, enabling routing for an entire lightpath to be dynamically determined. During continuing operations, new reservations are made, consuming node and lightpath segment resources. After a reservation for a lightpath has expired, the reserved resources for the lightpath are "released" and made available for new reservations. In one embodiment, a best lightpath route is selected at an ingress (i.e., source) node based on link state information in combination with performance metrics. A corresponding resource reservation message is generated containing information that explicitly defines the route. The resource reservation message is then routed to the various nodes along the route, and corresponding resources are reserved. Under another embodiment, the route may be dynamically determined using hop-by-hop route determination in a manner similar to IP routing.

The network topology or link state information essentially consists of all the lightpath segments and nodes along with all of the associated parameters for these resources (i.e., link costs, resources information, etc. Under a modified Open Shortest-Path First (OSPF) protocol, each edge and switching node periodically broadcasts its link state information to all other edge and switching nodes, using the OOB network management channel. Information concerning changes in the network topology (e.g., new links added or existing links removed, node or link failure, etc.) is likewise broadcast to all edge and switching nodes. More specifically, in one embodiment link state information is interchanged using a modified control burst format that includes an Extended Header field in which the link state information is stored.

Figure 14A:
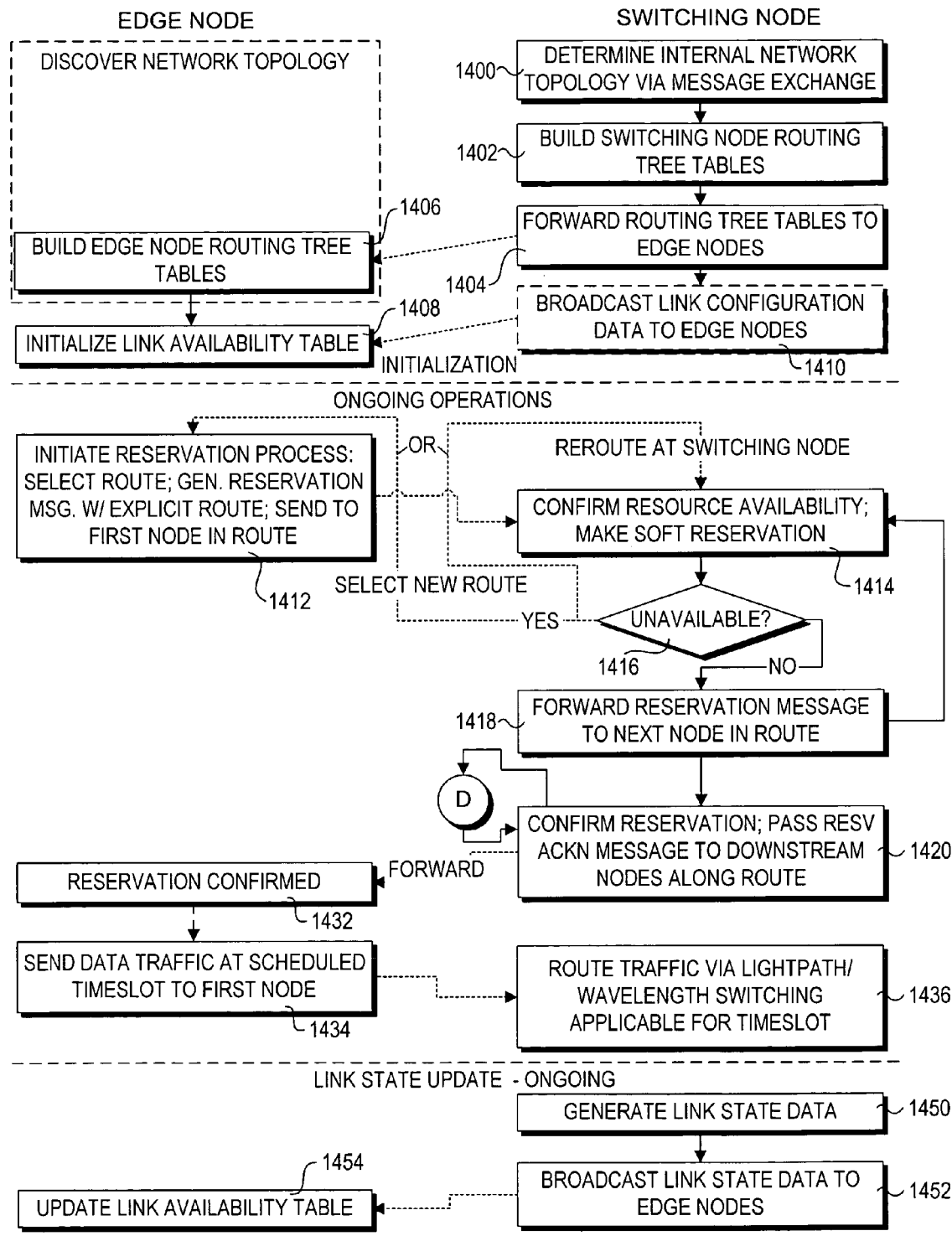
FIGS. 14a and 14b collectively comprises respective portions of a flowchart illustrating logic and operations performed by edge nodes and switching nodes during initialization and continuous operations of peer-to-peer routing, according to one embodiment of the present invention.

FIG. 14*a* shows a flow diagram illustrating an overview of the operations performed at the edge and switching nodes in support of peer routing, according to one embodiment of the invention. As depicted by the flowchart, the operations are performed in parallel. The top portion of the diagram concerns activities that are performed during network initialization and set up. In one embodiment, each edge and switching node builds a lightpath database representing all the possible PBS lightpaths and node resources. The lightpath information is stored in a table containing routing data similar to that contained in IP network routers. In one embodiment, the lightpath database is built via message exchanges between the various nodes using an OOB network management channel. In one embodiment, the PBS network topology discovery is accomplished by running a modified OSPF IP routing protocol. The OSPF protocol is well-known in the art, and is commonly used for IP routing within an autonomous system (e.g., LAN or enterprise network). From the information contained in the messages, routing trees can be built and forwarded to other nodes, enabling each switching node to build its own routing tree table. These operations are depicted in blocks 1400 and 1402. In another embodiment, the routing tree tables may be manually generated. This scheme is generally more applicable to smaller networks.

Figure 15:
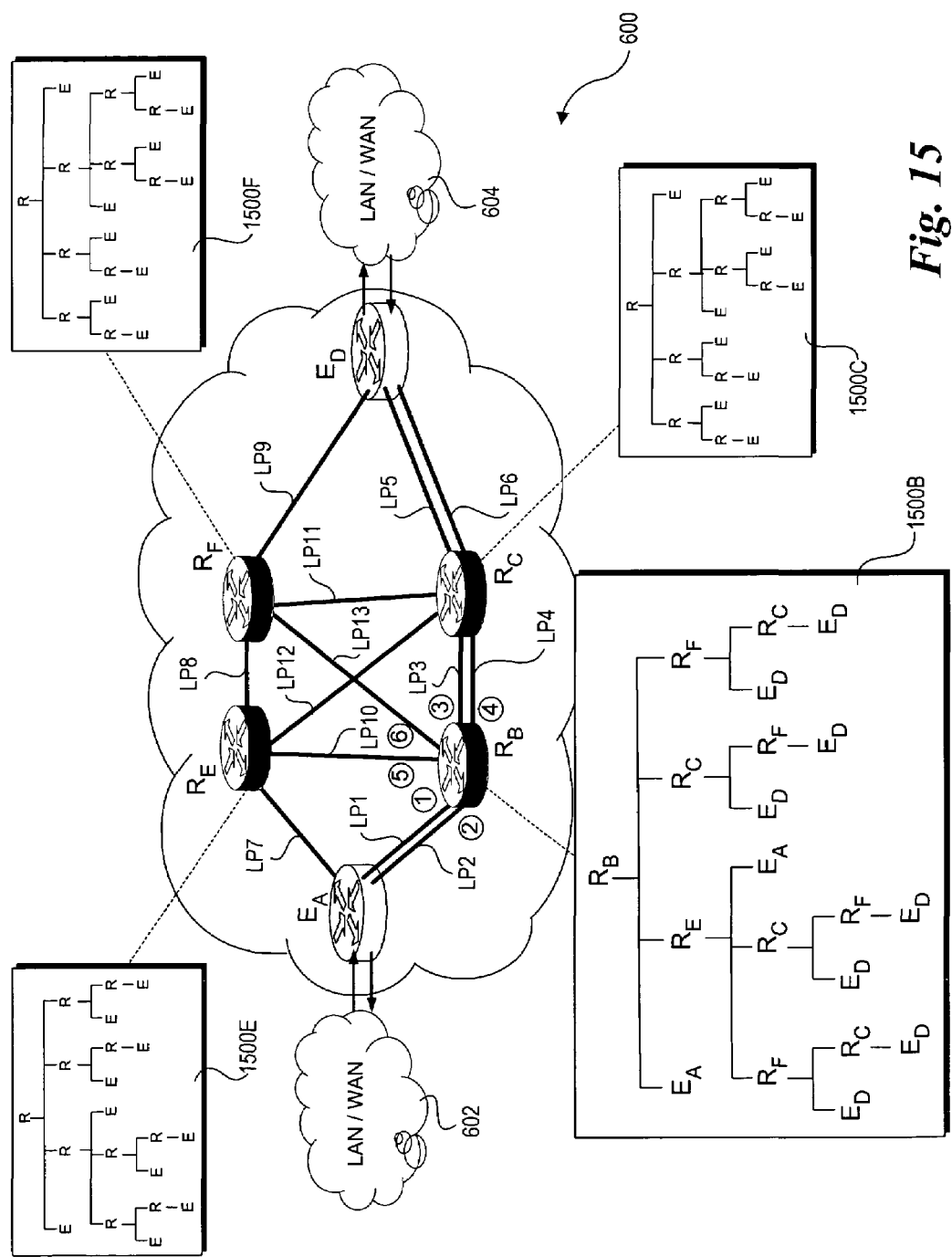
FIG. 15 is a schematic diagram that is analogous to the GMPLS-based PBS control network of FIG. 6, wherein the switching network nodes have been replaced with routers, and including details of an exemplary routing tree generated at a switching node.

In one embodiment, each switching node builds a "fixed" routing tree (embodied as a table) defining the available routes to other nodes based on the network topology at the time the routing trees are built. For example, a routing tree 1500B illustrative of an exemplary set of routing data contained in a fixed topology routing tree table is shown in FIG. 15. In this embodiment, each of switching nodes B, C, E, and F are modeled as respective routers $R_B$, $R_C$, $R_E$, and $R_F$, while the edge nodes A and D are respectively labeled $E_A$ and $E_D$. The routing tree 1500B graphically depicts the necessary hops from router $R_B$ (i.e., switching node B) to reach edge nodes EA and ED. The bottom node along each "branch", also known as a "leaf" node, represents the destination, while the topmost node (RB in this instance) represents the "root" of the routing tree. In general, circular or circuitous routes are not to be included in the routing tree table, as such routing is very inefficient. For example, a route between switching node C and edge node D spanning $R_C$-$R_E$-$R_B$-$R_F$-$E_D$ should not be included, even though it is a possible route between nodes C and D. Similar routing tables corresponding to routing trees 1500C, 1500E and 1500F are built at routers $R_C$, $R_E$, $R_F$, respectively. Techniques for building routing trees of this type are well-known in the networking art.

As depicted by a block 1406, a primary initialization task performed at each edge node involved building its own routing tree table. In one embodiment, the switching node routing tree information is propagated via message exchanges to the edge nodes during the network topology discovery operations, as depicted in a block 1404. In general, the edge nodes may receive routing tree information from their adjacent switching nodes and advertise the available routes. In response to receiving the routing tree tables from its adjacent switching nodes, each edge node will build its own routing tree table in block 1406.

In another embodiment, routing tree tables for the edge nodes are generated manually. This is performed in a manner similar to generating routing tree tables for the switching nodes. In one embodiment, routing tree tables are built by both the edge and switching nodes. In another embodiment, routing tree tables are manually generated for the edge nodes, while the switching nodes do not maintain any routing tree tables.

Figure 16:
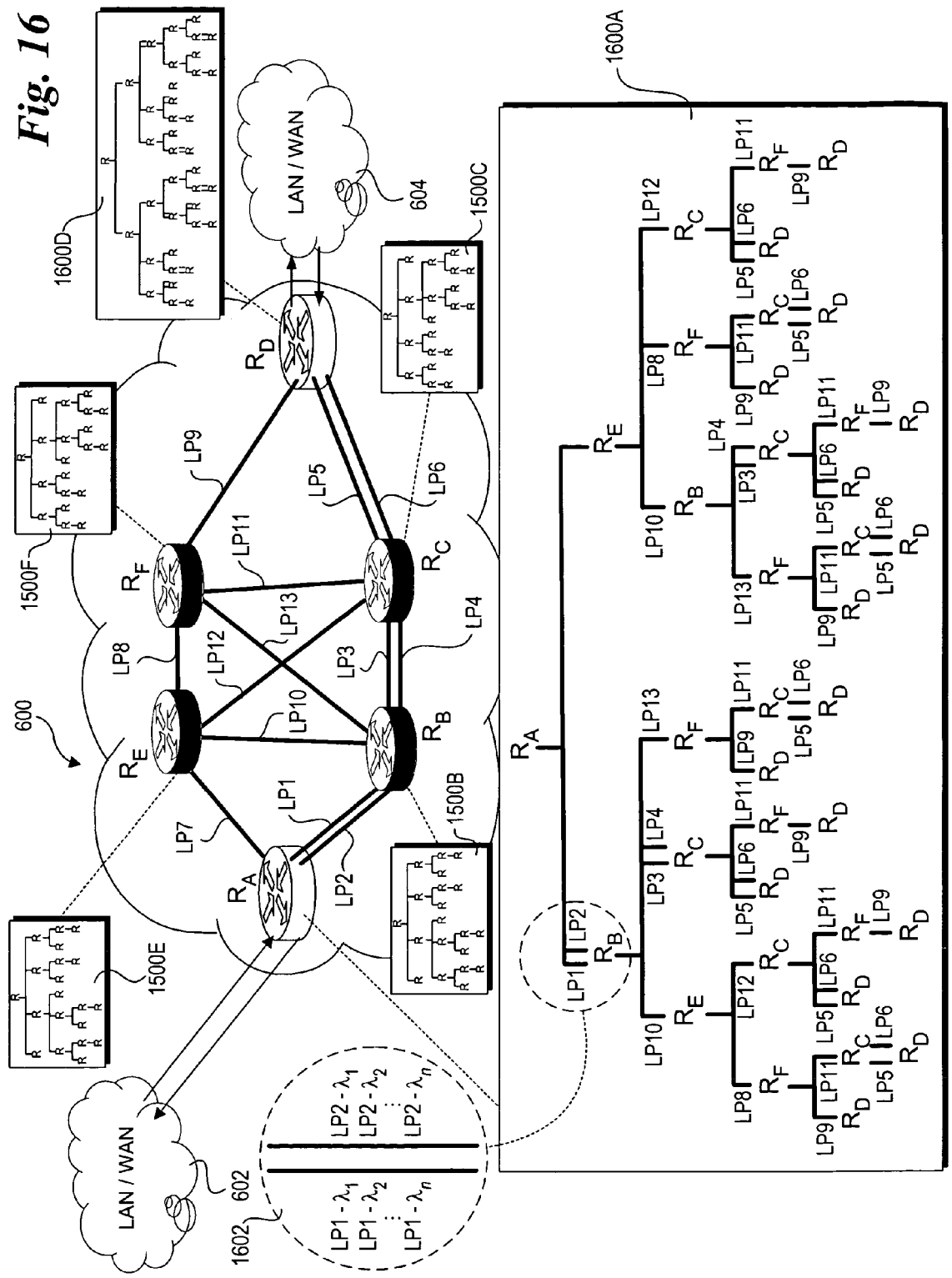
FIG. 16 is a schematic diagram corresponding to the diagram of FIG. 15, further showing routing trees for edge nodes A and D.

In one embodiment, the routing tree tables for edge nodes A and D will contain data corresponding to routing trees 1600A and 1600D, as shown in FIG. 16. In many respects, routing trees 1600A and 1600D are similar to the routing trees 1500B, 1500C, 1500E, and 1500F discussed above. The routing tree for a given edge node contains all routes from itself (as the source node) to the other edge nodes (the possible destination nodes). More specifically, the routing tree for each edge node will contain an aggregation of routing data comprising the routes generated by its adjacent switching nodes with the addition of respective lightpath segments between the edge and each adjacent switching node. Thus, in the example of FIG. 16, routing tree 1600A contains all routes from source node A to destination node D. Similarly, all routes from node D (as a source node) to node A (as a destination node) are stored in a routing tree 1600D.

In addition to this basic routing information, routing tree 1600A further includes details of lightpath segments and, in one embodiment, wavelength information for those segments. For example, as shown in detail 1602 of the lightpath between routers $R_B$ and $R_E$, information is stored corresponding to lightpaths LP1 and LP2, as well as wavelengths $\lambda_{1-n}$ for each lightpath.

In general, the best route from each ingress node to a corresponding destination node will depend on the available network resources in consideration of performance criteria such as class-of-service (CoS), traffic loadings, etc. In one embodiment, route availability and performance criteria data are stored in the routing database. In one embodiment, an instance of a routing database is stored at each edge node. In one embodiment, respective database instances are maintained at the edge nodes, and a replication mechanism is employed such that the data in the database instances is replicated on a periodic basis.

Figures 17, 18:
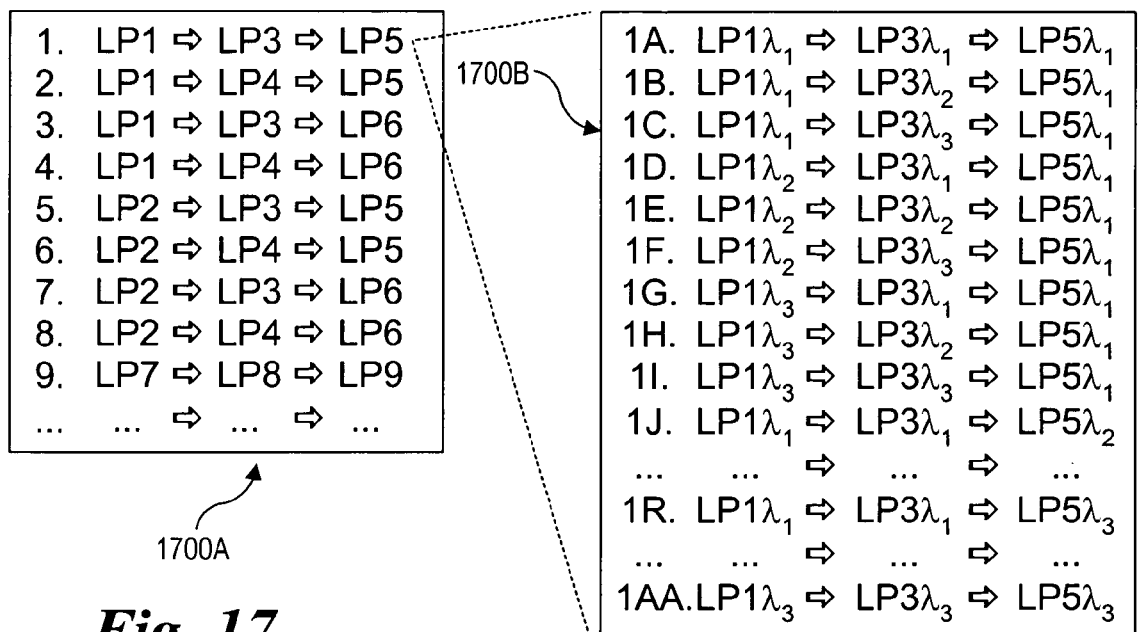
FIG. 17 is a diagram illustrating routing tree table data including a portion of the possible lightpaths between nodes A and D of Figures, 15, and 16.
FIG. 18 shows a portion of an exemplary LINK_AVAILABILITY table in which link availability data is stored, according to one embodiment of the invention.
Figure 19:
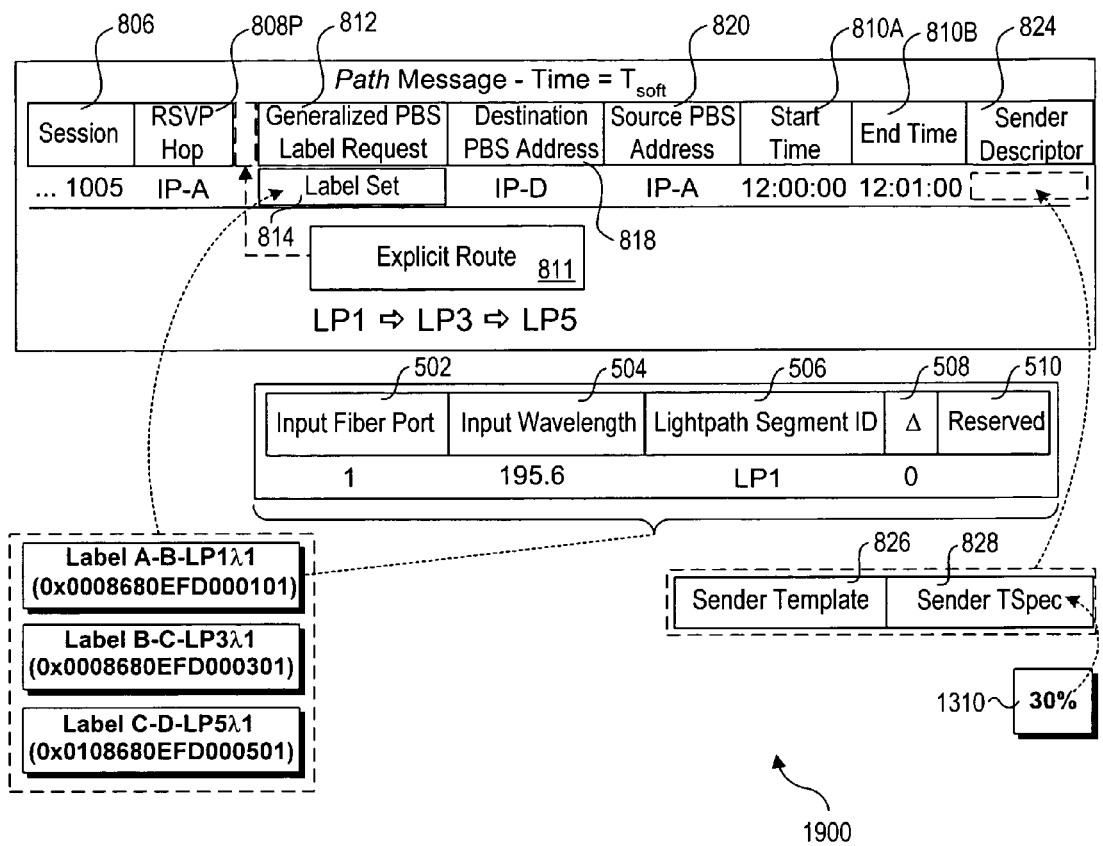
FIG. 19 is a schematic diagram illustrating components of a Path message employed in an example lightpath reservation process corresponding to FIG. 20.

Exemplary routing tree data 1700A and 1700B illustrative of data that are stored in a routing tree table maintained at an edge node are shown in FIG. 17. Typically, each row in a routing tree table will comprise a list of lightpath segments that, when concatenated, form a lightpath between the edge node and a destination node. Thus, the routing tree table will store a list of potential lightpaths that may be considered for transmitting data from a source node to a destination node. In the embodiment shown in routing tree table 1700A, lightpath routing information is defined at the lightpath segment level. Accordingly, only data signifying lightpath segments, such as a lightpath segment ID, needs to be stored in the table.

As discussed above, WDM implementations support transmissions using multiple concurrent wavelengths for each fiber segment. In support of this case, entries in routing table 1700A may be expanded to include routing details at the lightpath segment/wavelength level. This is exemplified by entries shown in a routing table 1700B corresponding to lightpath 1 of routing table data 1700A, wherein each of lightpath segments LP1, LP3, and LP5 support wavelengths $\lambda_1$, $\lambda_2$ and $\lambda_3$.

In one embodiment, the routes stored in a routing tree table are prioritized such that the lightpaths with the highest priority ratings are selected prior to lower priority lightpaths. For example, a prioritization algorithm may be used to prioritize lightpaths in the list as a function of one or more specific transmission-related criteria, such as single wavelengths first (i.e., lightpaths in which a single wavelength is used throughout the route) or as a function of the routing availability or traffic rules enforced at the time. The prioritization algorithm may also be used to reduce the size of the routing tree table, wherein lower priority routes are discarded or marked as unavailable. Furthermore, the prioritization of the potential lightpaths can be dynamically updated (i.e., reprioritized) if a change in network transmission conditions is detected, such as a change in network topology of if there is a need to balance the traffic loads across the network to achieve a desired performance. In other instances, the prioritization of the lightpaths may be determined based on observation of network behavior, e.g., through use statistical traffic data or employing a heuristic traffic prediction algorithm. Lightpath selection techniques of this sort are well-known in the art, so no further explanation of how this operation is performed is included herein.

After the edge nodes build their routing trees, a LINK_AVAILABILITY table is initialized in a block 1408. In one embodiment, routing tree data is stored in one table, while information pertaining to the availability of individual lightpaths or lightpath/wavelength combinations are stored in the LINK_AVAILABILITY table. For example, exemplary data corresponding to a LINK_AVAILABILITY table 1800 is shown in FIG. 18. Overall, the purpose of the routing tree table and LINK_AVAILABILITY table is to provide an edge node with information that will enable the edge node to select the best available route to schedule for subsequent data transmission for a selected time slot. As a result, this information may be combined into a single table, or may be stored in two or more linked tables. In one embodiment, the LINK_AVAILABILITY table may be initialized based on data stored in the routing tree table. In another embodiment, link configuration data is broadcast to the edge nodes by the switching nodes, as depicted in a block 1410. The LINK_AVAILABILITY table may then be initialized based on the link configuration data received at each edge node.

The operations and logic shown in the middle portion of FIG. 14 concern ongoing or continuous network operations that may be started after the initialization phase is complete. Thus, the operations and logic shown are repeated continually during this phase.

A typical transmission cycle begins in a block 1412, wherein a lightpath reservation process is initiated. In one embodiment, the reservation process begins by selecting a lightpath route. In the illustrated embodiment of FIGS. 17 and 18, this comprises a two-step process. First, a lightpath route is chosen based on prioritization rules. During this first step, the wavelength availability of the selected lightpath route is not considered, so that all "active" lightpaths are available for selection, while "inactive" lightpaths are not available. For example, an inactive lightpath might correspond to an existing entry in the routing tree table that is not currently available due to a node or lightpath segment failure.

Next, during the second step, the availability of each lightpath segment of the lightpath is considered by looking up resource consumption or availability information in LINK_AVAILABILITY table 1800. In one embodiment, this is an iterative process, wherein each segment along the lightpath is evaluated, one at a time. If resources for all segments are available, the lightpath selection is verified. If not, a new lightpath is selected, and the resource availability process is performed again to verify the availability of the selected lightpath.

Typically, the LINK_AVAILABILTY table will include data that identifies an availability of individual fiber segments or segment/wavelength combination. In one embodiment, individual records contain data that is directly derived from resource reservation data that is broadcast to the edge nodes on a periodic basis. For example, information corresponding to the "incoming" or "outgoing" half of the reservation records stored in resource reservation table 2000 described below are stored in LINK_AVAILABILITY table 1800.

The LINK_AVAILABILITY table 1800 includes a plurality of columns containing information relating to the availability of various lightpath segments during corresponding timeslots. In the illustrating embodiment, these include a Lightpath Segment ID column 1802, a Wavelength column 1804, a Start Time column 1806, and End Time column 1808, a Bandwidth % column 1801, and a Link Status column 1812. As will be seen below, in one embodiment the data in LINK_AVAILABILITY table 1800 mirrors resource reservation data maintained at the various switching nodes in the network.

The Lightpath Segment ID column 1802 contains the lightpath segment ID for a corresponding lightpath segment reservation. The Wavelength column 1804 contains the wavelength for the identified lightpath segment reservation. Although shown as a single column for illustrative purposes, wavelength information may be contained in two or more columns as well, depending on the wavelength translation scheme used. The values in Start Time and End Time columns 1806 and 1808 respectively correspond to the start and end times of a variable timeslot for which the lightpath segment reservation is made. The Bandwidth % column 1810 is used to store the percentage of bandwidth for the corresponding wavelength that is consumed by the reservation. In implementation in which fraction bandwidth allocations are not supported, their will be no Bandwidth % column. The value in Link Status column 1812 is a Boolean value that indicates whether the lightpath segment is available or not. This column facilitates a faster link availability lookup under conditions in which links may be down. A "1" indicates the link is active, while a "0" indicates the link is inactive.

The link availability data may be stored in a variety of different manners. In the embodiment illustrated in FIG. 18, individual records contain data that is identical portions of corresponding records stored in the resource reservation tables of each of the switching nodes. Thus, in order to determine the availability of a particular resource for a particular time slot, all of the records containing an overlapping time slot and corresponding to the particular lightpath segment or lightpath segment/wavelength combination are retrieved from LINK_AVAILABILITY table 1800 and aggregated to determine a total bandwidth consumption percentage. If the remaining (i.e., non-reserved) portion of the bandwidth is sufficient to support the to be reserved data transmission, then the process moves on to evaluated the availability of the next lightpath segment in the lightpath route. If not, an error message is generated to inform the edge node that it needs to select another route, as the selected route includes a resource that is not available. In another embodiment, the current bandwidth consumption or availability percentage or bandwidth amount is updated in response to receiving the link state data that is broadcast in block 1452 below. This process requires more overhead up front, but returns a faster result during a real-time query request for resource availability.

Once a selected lightpath has been verified for resource availability, a resource reservation message (in the form of a Path message) is generated that includes an explicit definition of the route. For example, FIG. 16 shows details of an exemplary Path message 1600 corresponding to a first pass of the resource reservation process in which an explicit lightpath route of LP1-LP3-LP5 is defined. The destination PBS address 818 contains the IP address of the destination node D, while source PBS address 820 contains the IP address of source node A. Since the most recent node to forward the message is the source node A, RSVP_Hop object 808P contains the IP address for node A.

Information specifying the lightpath segment and wavelength for the each of the lightpath segments along the route are stored in label set 814 under generalized PBS label request object 812. Reservation information corresponding to the first hop in the route is contained in a label A-B-LP1λ1. Each label includes information identifying an input fiber port for the receiving node (e.g., input fiber port 1 of switching node B), an input wavelength under which data signals will be transmitted on the fiber coupled to the input fiber port (195.6 THz) (it is noted that the input wavelength is actually determined as a function of the values in input wavelength field 504 and Δ field 508, as discussed above—a specific value is used here for illustrative purposes), and the lightpath segment ID (e.g., LP1) for the lightpath coupled between the sending and receiving nodes.

As discussed above, the reservations to be made comprise fine to coarse-grain time slot reservations corresponding to future scheduled uses of virtual network links comprising lightpaths made up of multiple concatenated lightpath segments. Accordingly, time period data corresponding to Time_Values object 810 comprising a start and end time for a corresponding reservation time slot are respectively stored in a start time object 810A and an end time object 810B. For illustrative purposes, the start time depicts 12:00:00 (i.e. 12 noon) and 12:01:00; in an actual implementation, date information may be included as well, either in the same fields or additional fields.

The explicit route information is contained in Explicit_Route object 811. In this instance, the Explicit_Route 811 contains a selected route of LP1-to-LP3-to-LP5.

In accordance with another aspect of the invention, reservations for the use of lightpath segments used to make up a given lightpath may be defined such that only a partial amount of the channel bandwidth is used. As discussed above, information defining a bandwidth % for the reservation may be stored in bandwidth % field 1310 of sender descriptor object 824. Reservation for a resource request that consumes less than or equal to the total available bandwidth for a given resource are accepted, while requests that would consume unavailable bandwidth will be denied.

Once generated, the Path message is sent to the first node in the explicit route, which will comprise a switching node. The Path message is then propagated through the upstream nodes defined by the explicit route, while the operations of blocks 1414, 1416, and 1418 are preformed at each switching node. These operations begin in block 1414, wherein the resource availability is confirmed. The reason for this operation is that although resource availability was previously verified at the source edge node, the availability data stored at that edge node may not be completely up to date. For example, a resource may be consumed by a reservation that is made after the most recent broadcast of link state information by a given node. In one embodiment, resource availability confirmation may be performed by retrieving any resource reservation records for the resource (e.g., lightpath segment or lightpath segment/wavelength) and time slot and verifying that there is enough remaining bandwidth % to meet the reservation request.

For example, a determination would be made to whether sufficient bandwidth percentage was available for the time slot based on a combination of fiber link (lightpath segment) and wavelength. Thus, a determination would be made in decision block 1408 to whether either of lightpath segments LP3 or LP4 could support the requested reservation. The availability information can be determined based on information contained in the resource reservation table for the current node, as described below.

An indication of sufficient resources means that the specified resource (i.e., the bandwidth request at the wavelength for the lightpath segment received at the next hop node) has not been previously scheduled for use over any portion of the specified time slot. In one embodiment, this information may be determined based on resource reservation lookup tables stored at each node, as exemplified by a resource reservation table 2000 shown in FIG. 20. The resource reservation table contains data pertaining to "soft" (requested, but yet to be confirmed) and "hard" (confirmed) reservations for the various transmission resources provided by the node. Reservation table 2000 includes a plurality of columns in which data are stored in rows, wherein data for a given row is called a "record," and the columns for a given record comprise data fields. The columns include an optional Key column 2002, an Input Fiber Port column 2004, an Input Wavelength column 2006, an optional Input Lightpath Segment ID column 2008, an Output Fiber Port column 2010, and Output Wavelength column 2012, an optional Output Lightpath Segment ID column 2014, a Start Time column 2016, and End Time column 2018, a Bandwidth % column 2020, and a Status column 2022.

In general, Key column 2002 is used to store a unique identifier (key) for each record, enabling quick retrieval of records and guaranteeing record uniqueness. In one embodiment, the key contains information corresponding to the session object 806 of the Path message. In another embodiment, the key is derived from a combination of data in fields corresponding to the PBS label (i.e., in input fiber port column 2004, input wavelength column 2006, and lightpath segment ID column 2008). This enables quick lookup of reservation entries in response to processing control bursts containing specific PBS resource allocation requests.

Data relating to incoming link parameters are stored in Input Fiber Port column 2004, Input Wavelength column 2006, and, optionally, Input Lightpath Segment ID column 2008, while data relating to outgoing link parameters are stored in Output Fiber Port column 2010, Output Wavelength column 2012, and, optionally, Output Lightpath Segment ID column 2014. Each switching node is coupled to two or more fiber links via respective I/O ports. For example, the exemplary data in reservation table 2000 corresponds to switching node B, which includes six network input/output (I/O) ports, depicted as encircled numbers 1-6 in FIG. 15. The value in Input Fiber Port column 2004 identifies the I/O port at which data is received by the particular switching node maintaining the reservation table, while the value in Output Fiber Port column 2010 identifies the I/O port via which data is transmitted. As an option, input and output fiber routing data may be stored through reference to input and output lightpath segments, in lieu of or in addition to specifying I/O ports. Accordingly, in one embodiment, data identifying the input and output lightpath segments is stored in Input Lightpath Segment ID column 2008 and Output Lightpath Segment ID column 2014, respectively.

As discussed above, a given lightpath segment may support concurrent data streams that are transmitted using different wavelengths. Accordingly, data in Input Wavelength column 2006 is used to identify the wavelength incoming data is to be transmitted at for a given reservation record, while data in Output Wavelength column 2012 is used to identify the wavelength outgoing data is to be transmitted at.

Routing paths through each switching node are reserved for a respective time slot of variable duration based on appropriate information contained in the reservation request message. Typically, the time slot will be delineated by a start time and an end time, with corresponding data stored in Start Time column 2016 and End time column 2018. Typically, a resource reservation request will reserve a resource time slot for a variable amount of time from sub-seconds to days. For simplicity, the time data shown Start Time column 2016 and End Time column 2018 only reflect the second level.

The bandwidth % for the request, as well as previously allocated bandwidth %'s, are stored in bandwidth % column 2020. Status bits identifying unconfirmed (0) and confirmed (1) reservations are stored in reservation status column 2022.

In one aspect, resource availability is determined based on the bandwidth availability for the requested lightpath segment, input wavelength, and time period. It is noted that any entry with a time period overlapping the requested time period and having similar parameters to the requested resource is considered, including reservations for both incoming and outgoing traffic. The bandwidth percent of the entries is aggregated, along with the requested bandwidth. If the sum of the bandwidth exceeds a selected threshold value (e.g., 100%) within the same start and end times, there are inadequate resources to satisfy the request.

Returning to FIG. 14a, in a decision block 1416, a determination is made to whether the resource is available. If it is, the logic moves forward to block 1418, wherein the Path message is forwarded to the next node identified by the explicit route. In connection with this operation, the IP address information contained in RSVP Hop object 808P is updated to reflect the new previous hop node (e.g., node B in this example). If the resource is unavailable, the reservation cannot be completed. In response, in one embodiment a PathErr message is propagated back or broadcast to the source edge node. Upon receiving the message, the source edge node selects a new route, and the previous route reservation process is repeated, beginning at block 1412. In another embodiment, each switching node is configured to maintain its own routing tree table. In this embodiment, the Path message may be rerouted by the switching node by updating the explicit route defined by Label_Set 812. In one embodiment, the entirety of the remainder of the lightpath route may be specified by the switching node. In another emobidment, the remainder of the route is determined on a hop-by-hop basis, wherein the determination of the next hop is made as the reservation message is passed through various switching nodes along a (now) inexplicit route.

Once the Path message has been forwarded to the destination, operations are performed to confirm the soft reservations at each node by propagating a reservation acknowledge (Resv) message downstream along the reserved lightpath route. These operations are depicted by a block 1420.

Figure 14B:
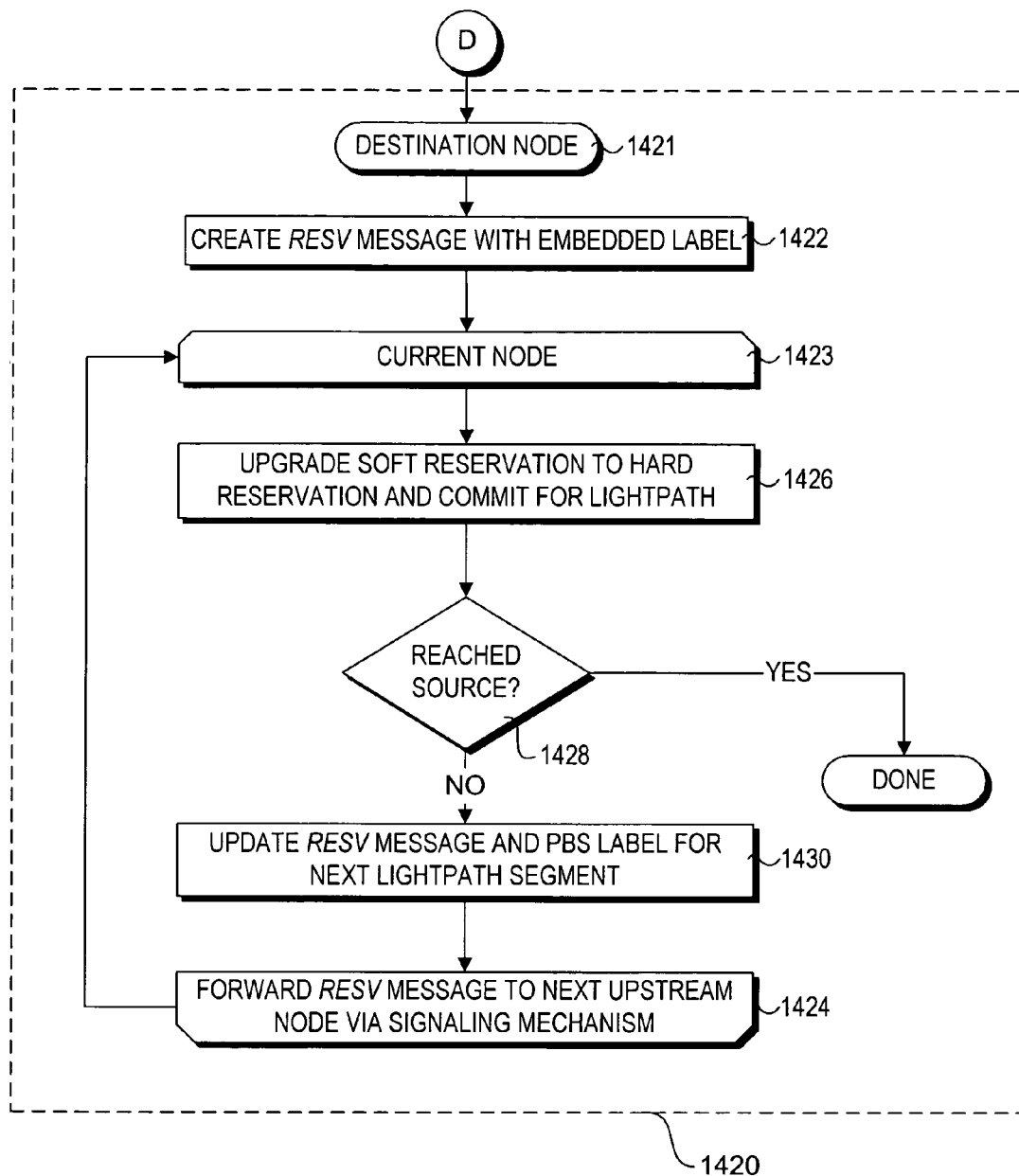

Further details of the operations of block 1420 are shown in FIG. 14b, which represents the upstream portion of the reservation request. At this point the current node is the destination node D, as depicted by a start block 1421. As before, operations are repeated for each of the nodes along the selected lightpath, akin to a back-propagation technique; these operations are delineated by start and end loop blocks 1423 and 1424. The operations are performed at each node, in reverse sequence to the downstream traversal of the lightpath using a Resv message that is created in a block 1422.

Figure 21:
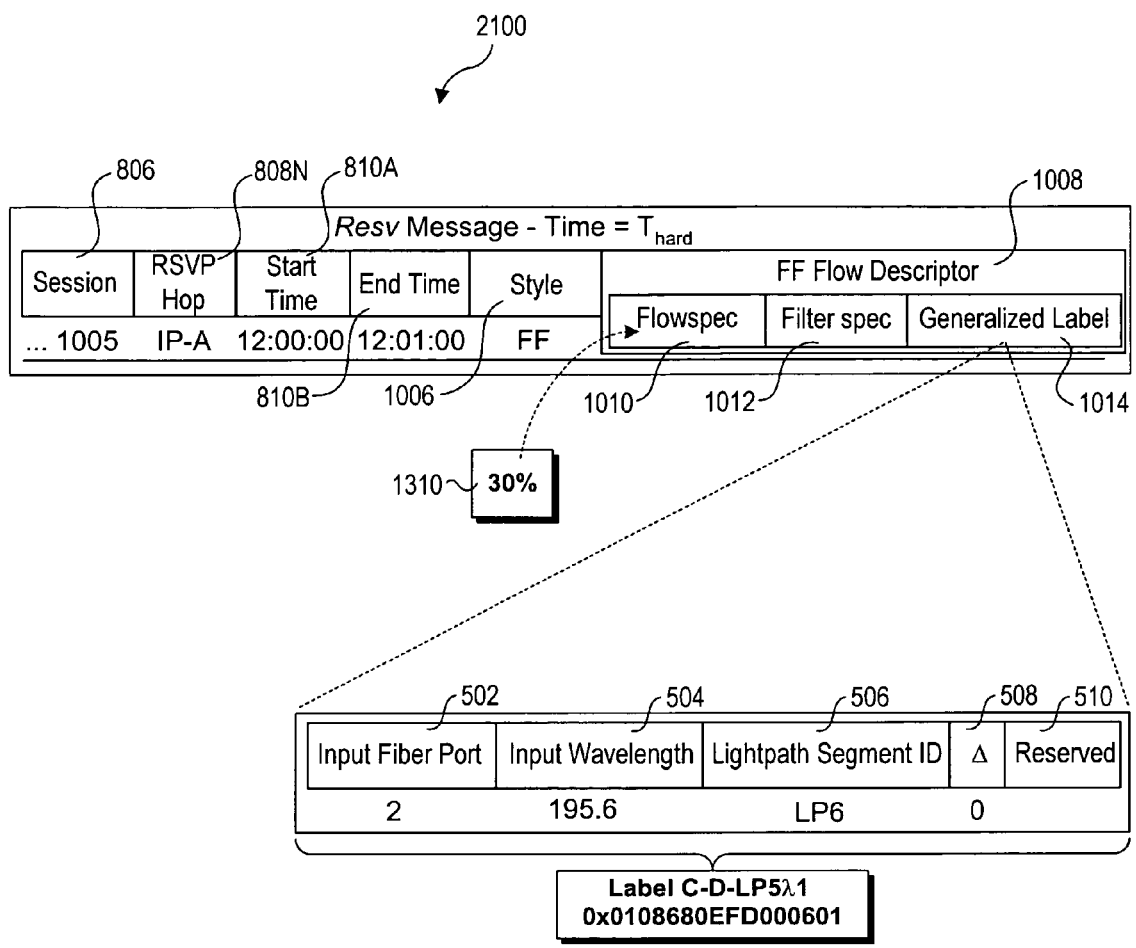
FIG. 21 is a schematic diagram illustrating components of a Resv message employed in an example lightpath reservation process corresponding to FIGS. 14b.

An exemplary Resv message 2100 corresponding to the current state is shown in FIG. 21. Many of the objects contained in Resv message 2100 contain similar values to like-numbered objects contained in Path message 1900, including Session object 806, and start and end time objects 810A and 810B. As discussed above, the Resv message contains a flow descriptor 1008 that includes a PBS_Flowspec 1010, a Filter_Spec 1012, and a Generalized_PBS_Label 1014. In a similar manner to PBS_Sender_TSpec 828 of Path message 1600, PBS_Flowspec 1010 includes a filter field 1310 value of 30%. Also, the Generalized_PBS_Label 1014 will have a form similar to generalized PBS label 500 discussed above. In this instance, the PBS label C-D-0 corresponding to lightpath segment LP5 comprises the first form of the embedded label.

After the initial Resv message is created, the logic proceeds to the looping operation delineated by start and end loop blocks 1423 and 1424. The first operation in the loop occurs in a block 1426, wherein the software reservation for the current node is upgraded to a hard reservation, and the corresponding resources are committed. This is reflected by changing the value in reservation status column 2022 from a "0" (soft, i.e., unconfirmed) to a "1" (hard, i.e., confirmed, meaning the resources are committed).

Following the operation of block 1426, a determination is made to whether the source node has been reached in a decision block 1428. If it has, the process is completed, and all segments on the lightpath are reserved for a subsequent scheduled use. If not, the process proceeds to a block 1430 in which the Resv message and PBS label are updated for the next lightpath segment. The process then repeats itself for the next (now current) switching node until the source node is reached. At this point, all the nodes along the lightpath will have hard (i.e., confirmed) reservations, and the entire lightpath will be scheduled for use during the indicated time slot contained in the reservation table, as depicted by a block 1432.

At this point, the reservation of the lightpath is confirmed, and the switching nodes are configured to switch optical signals passing through them during the scheduled time slot. Accordingly, data traffic (i.e., one or more data bursts) may then be sent across the lightpath, which begins by sending the data traffic from the source edge node to the first switching node in a block 1434. The data is routed along the rest of the lightpath based on the scheduled switching configuration of the other nodes along the lightpath, as depicted by a block 1436.

An additional set of continuous operations corresponding to link state updates are shown at the bottom of FIG. 14 are also performed. In general, these operations are performed asynchronous to those in the continuous section discussed above, although synchronous operations may also be implemented. The purpose of the link state update operation is to apprise each edge node of the present availability of each switching node resource. The link sate data is generated in a block 1450, and broadcast to the edge nodes in a block 1452. As discussed above, in one embodiment this comprises broadcasting resource reservation data on a periodic basis to the edge nodes. In another embodiment, resource reservation data for individual reservations may be broadcast to the edge nodes in response to reservation confirmation at the switching nodes (real-time link state updating). In general, the link state data may be broadcast over an OOB management channel or an in-band channel. The advantage of periodic broadcast is that it reduces overhead and management channel bandwidth consumption compared with real-time link state updating. The advantage of real-time link state updating is that the link availability information stored at the edge nodes is more up to date, substantially eliminating the likelihood that a resource along a selected and verified lightpath will be unavailable.

In response to receiving the updated link state data, the LINK_AVAILABILITY tables (or equivalent availability data) are updated at each of the edge nodes in a block 1454. The ideal here is to have the link availability data reflect the current link states of the network for given time slots, such that the lightpath that are verified as available at the edge nodes are, in fact, actually available when the lightpath reservation message is sent.

A simplified block diagram 2200 of a PBS edge node architecture in accordance with one embodiment is shown in FIG. 22. The architecture components include a processor 2202, which is coupled in communication with each of a memory 2204, firmware 2206, optional non-volatile storage 2208, an external network interface 2210, and a PBS network interface 2212. The external network interface provides functionality for interfacing with an external network, such as a LAN, WAN, or another PBS network. PBS network interface 2212 provides functionality for interfacing with the internal infrastructure within a PBS network. The PBS network interface will generally be coupled to one or more fiber links, labeled as input/output fibers in FIG. 22 to illustrate that the interface can support both input and output data transmission.

The burst assembly and framing, burst scheduling and control, which are part of the PBS MAC layer and related tasks, are performed by processor 2202 via execution of instructions comprising a PBS module 2214, which is loaded into memory 2204 for execution. In one embodiment, processor 2202 comprises a network processor. Network processors are very powerful processors with flexible microarchitecture that are suitable to support wide-range of packet processing tasks, including classification, metering, policing, congestion avoidance, and traffic scheduling. For example, the Intel® IXP2800 NP, which has 16 microengines, can support the execution of up to 1493 microengines instructions per packet at packet rate of 15 million packets per second for 10 GbE and a clock rate of 1.4 GHz.

Figure 20:
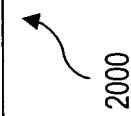
FIG. 20 is a diagram illustrating an exemplary resource reservation table hosted by node B of FIGS. 15 and 16 and containing data used in connection with explaining the lightpath reservation process of FIGS. 14a and 14b.

Functionality for performing operations corresponding to the flowcharts of FIGS. 14a, 14b, and the edge node side of the flow diagram of FIG. 20 may be implemented via execution of firmware and/or software instructions on processors provided by the edge nodes. The instructions for performing these operations are collectively depicted as a router module 2216. Execution of the router module 2216 enables a PBS edge node to perform the various routing operations discussed herein, including building and updating a ROUTING_TREE table 2218 and LINK_AVAILABILITY 1800. In general, the instructions corresponding to router module 2216 and PBS module 2214 may be stored in non-volatile storage 2208 or on a disk-based storage device, such as a disk drive (not shown).

Embodiments of method and apparatus for implementing a resource reservation schedules in a photonic burst switching network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A method comprising:
   dynamically discovering an available lightpath route comprising a concatenation of a plurality of lightpath segments connected via respective nodes along a route spanning from a source edge node to a destination edge node and including at least one switching node in an optical switched network;
   generating a lightpath reservation message containing an explicit route corresponding to the available lightpath route that was discovered and a scheduled time slot during which network resources are to be reserved; and
   reserving resources along the explicit route to enable transmission of data between the source and destination nodes along the explicit route during the scheduled time slot, wherein reservation of the resources causes said at least one switching node and the source and destination edge nodes to be configured so as to form a virtual optical-switched circuit between the source and destination edge nodes during the scheduled time slot,
   wherein dynamically discovering the available lightpath route includes:
      maintaining a routing table at the source edge node containing a list of potential lightpath routes that may be used to reach the destination edge node;
      maintaining link availability information at the source edge node corresponding to an availability of link and node resources in the optical switched network;
      selecting a lightpath route from the routing table for which a lightpath reservation during a scheduled time slot is to be made; and
      verifying sufficient resources are available to support the lightpath reservation based on the link availability information,
   wherein verifying sufficient resources includes:
      identifying the switching nodes along the lightpath route; and
      for each switching node, aggregating any existing reservations for a node resource of the switching node corresponding to a specified bandwidth and the scheduled time slot to obtain an existing resource allocation, adding a bandwidth percentage corresponding to a resource reservation request to the existing resource allocation to obtain a requested allocation for the node resource, and determining if the requested allocation exceeds a threshold.

2. The method of claim 1, wherein the optical switched network comprises a photonic burst switched (PBS) network.

3. The method of claim 2, wherein the optical burst switched network comprises a wavelength-division multiplexed (WDM) PBS network.

4. The method of claim 1, wherein the routing table comprises a routing tree table.

5. The method of claim 4, further comprising confirming each node has sufficient resources to support data transmission via the lightpath route during the scheduled time slot.

6. The method of claim 5, further comprising:
   sending an reservation error message to the source edge node if it is determined that a node does not have sufficient resources to support data transmission via the lightpath route during the scheduled time slot; and
   selecting, at the source edge node, a new lightpath route to reserve resources for based on the routing tree table and the resource availability information.

7. The method of claim 4, further comprising:
   sending link state information indicative of an availability of node and link resources for the optical switched network to the source edge node; and
   updating the link availability information at the source edge node.

8. The method of claim 7, wherein the link state information is sent periodically from the switching nodes in the optical switched network.

9. The method of claim 8, wherein link state information is sent from a switching node in response to a resource reservation that has been confirmed for the switching node.

10. The method of claim 5, further comprising prioritizing the potential lightpaths in the list based on at least one transmission-related criteria.

11. The method of claim 10, further comprising dynamically reprioritizing the potential lightpaths in the list in response to a detected change in network transmission conditions.

12. The method of claim 10, wherein the potential lightpaths are prioritized based on traffic balancing considerations.

13. The method of claim 10, further comprising dynamically reprioritizing the potential lightpaths in the list in response to a detected change in network topology.

14. The method of claim 4, further comprising:
   making a soft reservation for a node resource if sufficient resources to support the lightpath reservation are determined to be available for the time slot.

15. The method of claim 14, wherein soft reservations of the node resources are made during a upstream traversal of the lightpath route, and the method further comprises:
   passing a resource reservation response message between the nodes in a downstream traversal of the lightpath route, the resource reservation response message including resource reservation response information;
   extracting, at each node, the resource reservation response information from the resource reservation response message; and
   changing, at each node, the soft reservation for the node resource to a hard reservation.

16. The method of claim 15, wherein the resource reservation response message comprises a Resv message having a format based on an extension to the RSVP-TE (ReSerVation Protocol-Traffic Engineering) signaling protocol.

17. The method of claim 4, wherein the lightpath reservation message includes a generalized multi-protocol label-switching (GMPLS)-based label defining transmission parameters for a lightpath segment to which the GMPLS-based label corresponds.

18. The method of claim 17, wherein the GMPLS-based label includes at least one field identifying an input wavelength employed for carrying signals over a lightpath segment identified by the GMPLS-based label.

19. The method of claim 4, wherein the lightpath reservation message comprises a Path message having a format based on an extension to the RSVP-TE (ReSerVation Protocol-Traffic Engineering) signaling protocol.

20. The method of claim 1, wherein a partial use of a network resource may be reserved.

21. The method of claim 20, wherein the partial use comprises a bandwidth percentage use of a lightpath segment.

22. The method of claim 1, wherein the lightpath route is dynamically discovered using a modified version of the Open Shortest Path First (OSPF) protocol based on updated link state information.

23. An edge node apparatus for use in an optical switched network, comprising:
  a processor;
  an optical switched network interface, coupled to the processor, including at least one optical port;
  an external network interface, coupled to the processor, including at least one external network port;
  memory, coupled to the processor; and
  storage, coupled to the processor, in which instructions are stored, which when executed by the processor perform operations, including:
    maintaining a routing tree table in memory identifying applicable routes to route data between the edge node apparatus when implemented as a source node in an optical switched network and other nodes in the optical switched network;
    maintaining link availability information in the memory corresponding to a future availability of link and node resources in the optical switched network;
    selecting a lightpath route from the routing tree table for which a lightpath reservation during a scheduled time slot is to be made, said lightpath route spanning from the edge node apparatus to a destination node and including at least one switching node in the optical switched network;
    verifying sufficient resources are available to support the lightpath reservation based on the link availability information;
    generating a lightpath reservation message explicitly identifying the selected route; and
    forwarding the lightpath reservation message to a first hop node along the selected route.

24. The edge node apparatus of claim 23, wherein execution of the instructions further performs the operation of reserving a resource corresponding to transmission of data over a first lightpath segment coupled between the optical switched network interface and a first hop node along the lightpath route.

25. The edge node apparatus of claim 23, wherein the resource is reserved by performing operations including:
  making a soft reservation of resources supporting data transmission via the first lightpath segment for the scheduled time slot;
  receiving a reservation response; and
  changing the soft reservation to a hard reservation to commit the resources for the scheduled time slot.

26. The edge node apparatus of claim 23, wherein execution of the instructions further performs the operation of:
  receiving link state information indicative of an availability of node and link resources for the optical switched network; and
  updating the link availability information.

27. The edge node apparatus of claim 23, wherein the optical switched network comprises a photonic burst switched (PBS) network.

28. The edge node apparatus of claim 23, wherein the optical switched network comprises a wavelength-division multiplexed (WDM) PBS network; and the optical switched network interface includes at least one optical port supporting concurrent transmission of respective optical signals comprising different wavelengths.

29. The edge node apparatus of claim 23, wherein the lightpath resource reservation request message comprises a Path message having a format based on an extension to the RSVP-TB (ReSerVation Protocol-Traffic Engineering) signaling protocol and includes routing information defining an explicit route corresponding to the selected lightpath route via which the Path message is to be forwarded.

30. The edge node apparatus of claim 23, wherein execution of the instructions further performs the operation of prioritizing the applicable routes in the routing tree table based on at least one transmission-related criteria.

31. The edge node apparatus of claim 30, wherein execution of the instructions further performs the operation of dynamically reprioritizing the applicable routes in the routing tree table in response to a detected change in network transmission conditions.

32. The edge node apparatus of claim 30, wherein the applicable lightpaths are prioritized based on traffic balancing considerations.

33. The edge node apparatus of claim 30, wherein execution of the instructions further performs the operation of dynamically reprioritizing the applicable routes in the routing tree table in response to a detected change in network topology.

34. The switching node apparatus of claim 23, wherein verifying sufficient resources are available to support the lightpath reservation based on the link availability information comprises:
  identifying the switching nodes along the lightpath route;
  for each switching node:
    aggregating any existing reservations for the node resource corresponding to a specified bandwidth and the scheduled time slot to obtain an existing resource allocation;
    adding the bandwidth percentage corresponding to a resource reservation request to the existing resource allocation to obtain a requested allocation for the node resource; and
    determining if the requested allocation exceeds a threshold.

35. A machine-readable medium to provide instructions, which when executed by a processor in a edge node apparatus comprising a source node in an optical switched network, cause the edge node apparatus to perform operations comprising:
  dynamically discovering an available lightpath route comprising a concatenation of a plurality of lightpath segments connected via respective nodes along a route spanning from the source node to a destination edge node and including at least one switching node in an optical switched network;
  generating a lightpath reservation message containing an explicit route corresponding to the available lightpath route that was discovered and a scheduled time slot during which network resources are to be reserved; and
  reserving resources along the explicit route to enable transmission of data between the source and destination nodes along the explicit route during the scheduled time slot, wherein reservation of the resources causes said at least one switching node, the source node, and the destination edge node to be configured so as to form a virtual optical-switched circuit between the source node and the destination edge node during the scheduled time slot, wherein dynamically discovering the available lightpath route comprises:
  maintaining a routing tree table identifying applicable routes to route data between the edge node apparatus and other nodes in the optical switched network;
  maintaining link availability information corresponding to a future availability of link and node resources in the optical switched network;
  selecting a lightpath route from the routing tree table for which a lightpath reservation during a scheduled time slot is to be made, said lightpath route spanning from the edge node apparatus to the destination node and including the at least one switching node in the optical switched network;
  verifying sufficient resources are available to support the lightpath reservation based on the link availability information;
  generating a lightpath reservation message explicitly identifying the selected route; and
  forwarding the lightpath reservation message to a first hop node along the selected route.

36. The machine-readable medium of claim 35, wherein execution of the instructions further performs the operations of:
  receiving link state information indicative of an availability of node and link resources for the optical switched network; and
  updating the link availability information.

37. The machine-readable medium of claim 35, wherein execution of the instructions further performs the operation of prioritizing the applicable routes in the routing tree table based on at least one transmission-related criteria.

* * * * *